United States Patent [19]

Sasaki et al.

[11] Patent Number: 5,319,451
[45] Date of Patent: Jun. 7, 1994

[54] COLOR SIGNAL PROCESSING APPARATUS USING A COMMON LOW PASS FILTER FOR THE LUMINANCE SIGNAL AND THE COLOR SIGNALS

[75] Inventors: Takashi Sasaki; Toshihiko Mimura, both of Yokohama, Japan

[73] Assignee: Canon Kabushiki Kaisha, Tokyo, Japan

[21] Appl. No.: 993,454

[22] Filed: Dec. 16, 1992

Related U.S. Application Data

[63] Continuation of Ser. No. 358,268, May 30, 1989, abandoned.

[30] Foreign Application Priority Data

May 31, 1988 [JP] Japan .................... 63-134587
Jun. 22, 1988 [JP] Japan .................... 63-155693
Jul. 13, 1988 [JP] Japan .................... 63-175782

[51] Int. Cl.⁵ .............................................. H04N 9/07
[52] U.S. Cl. .................................... 358/282; 348/273
[58] Field of Search ................ 358/21 R, 41, 43, 44, 358/48, 37, 166, 167; 364/724.01, 724.13, 724.16; H04N 9/07, 9/09

[56] References Cited

U.S. PATENT DOCUMENTS

| | | | |
|---|---|---|---|
| 4,016,598 | 4/1977 | Yamanaka | 358/41 |
| 4,652,928 | 3/1987 | Endo et al. | 368/44 |
| 4,663,661 | 5/1987 | Weldy et al. | 358/43 |
| 4,716,455 | 12/1987 | Ozawa et al. | 358/44 |
| 4,751,567 | 6/1988 | Hashimoto | 358/43 |
| 4,789,890 | 12/1988 | Itoh et al. | 358/37 |
| 4,821,223 | 4/1989 | David | 364/724.16 |
| 4,858,004 | 8/1989 | Kitazaki et al. | 358/11 |
| 4,882,628 | 11/1989 | Sugimori et al. | 358/167 |
| 4,961,110 | 10/1990 | Nakamura | 358/37 |
| 4,982,354 | 1/1991 | Takeuchi et al. | 364/724.16 |
| 5,049,983 | 9/1991 | Matsumoto et al. | 358/44 |

FOREIGN PATENT DOCUMENTS

1-320811 12/1989 Japan .................... 364/724.16

Primary Examiner—Mark R. Powell
Assistant Examiner—Kim Yen Vu
Attorney, Agent, or Firm—Fitzpatrick, Cella Harper & Scinto

[57] ABSTRACT

A color signal processing apparatus for processing signals from a color signal-plate sensor having an offset sampling filter array and obtaining a luminance signal and a plurality of color signals, wherein a vertical and/or horizontal low-pass filter is used in common for both the luminance signal and the plurality of color signals. The low-pass filter preferably includes a shift register having a stage number equal to the number of pixels of the sensor in the horizontal direction, and a switch for alternately selecting a zero signal and data, and the vertical low-pass filtering is performed digitally.

13 Claims, 16 Drawing Sheets

COLOR SIGNAL PROCESSING APPARATUS USING A COMMON LOW PASS FILTER FOR THE LUMINANCE SIGNAL AND THE COLOR SIGNALS

This application is a continuation of application Ser. No. 7/358,268 filed May 30, 1989, now abandoned.

BACKGROUND OF THE INVENTION

1. Field of the Invention

The present invention relates to a color signal processing apparatus suitable for use with a single-plate color camera.

2. Description of Related Background Art

As a signal processing apparatus for a single-plate color camera, a switch-Y system using a color sensor of a pure color stripe type or a complementary color stripe type, a mosaic system using a stripe type color sensor, and the like have been proposed heretofore. The switch-Y system using a stripe color sensor in particular is simple in its circuit arrangement so that it has been widely used. The process conducted in the switch-Y system of a pure color stripe type is shown in FIG. 2 in the form of a block diagram.

Red (R), green (G) and blue (B) signals obtained from R, G and B colors are made to have the same output level relative to a white color at amplifiers 201 to 203. Thereafter, they are subjected to A/D conversion within a gamma correction circuit 204 and then gamma-corrected.

Thereafter, as disclosed in U.S. Pat. No. 4,751,567, the R, G and B signals are alternately selected to form a broad bandwidth luminance signal YH at a switch-Y 208. The bandwidth of signal YH is limited at a low-pass filter 210 and passed to a delay 211 and aperture compensation (APC) filter or contour emphasizing circuit 212 to obtain a final signal Y. In the meantime, the color signals are made narrower at low-pass filters 205 to 207 and inputted to a processor 209 whereat a narrow band luminance signal YL is obtained from the inputted R, G and B signals to output two color difference signals R-YL and B-YL.

Consider next the above-described technique applied to a sensor with a color filter mounted on the pixels disposed in a so-called offset sampling array, as shown in FIG. 3.

In a typical sensor, 640 pixels are disposed on one line in the horizontal direction, and 480 lines are disposed in the vertical direction, with the pixels being offset by half a pixel relative to the pixels on adjacent lines. A stripe structure of R-G-B is formed on a particular line. Therefore, signal processing for such a sensor can be performed substantially in the same manner as a conventional general stripe type sensor shown in FIG. 2, excepting for the following points.

Since the sensor pixels are disposed in an offset sampling array as shown in FIG. 3, the low-pass filtering of luminance and color signals is required to be performed not one-dimensionally but two-dimensionally. This requirement will be described separately for a luminance signal and a color signal.

The switch-Y system relies upon the concept that the signal obtained from an R, G or B filter is assumed equivalently as a luminance signal. In such a system, centers (as indicated by a circle in FIG. 4) of sampling points for luminance signals Y are disposed in an offset sampling array with an offset of d/2, where d is a pitch of pixels in the horizontal direction. To obtain a high resolution by positively utilizing the advantages of the offset sampling array, it becomes necessary to properly interpolate luminance signals at positions indicated by a cross x in FIG. 4 by using adjacent pixels. An optimum interpolation value X at a position indicated by a cross x is principally an average value of all the two-dimensionally extending signals at positions indicated by a circle, the average value being weighted by an obliquely extending sine function.

There are well known simple interpolation methods of obtaining an approximate interpolation value, such as $$X = \tfrac{1}{4}a + \tfrac{1}{4}b + \tfrac{1}{4}c + \tfrac{1}{4}d \tag{1}$$

$$X = \tfrac{1}{2}a + \tfrac{1}{2}b \tag{2}$$

$$X = a \tag{3}$$

From a different point of view, the above methods can be considered as performing a two-dimensional low-pass filtering by calculating a two-dimensional convolution function by inserting a sampled value into the position indicated by a circle and a zero value into the position indicated by a cross x.

The above interpolation calculation (1), (2) and (3) correspond to the following convolution functions Y1, Y2 and Y3.

$$Y_1 = \begin{bmatrix} 0 & 1/4 & 0 \\ 1/4 & 1 & 1/4 \\ 0 & 1/4 & 0 \end{bmatrix} \tag{4}$$

$$Y_2 = \begin{bmatrix} 1/2 \\ 1 \\ 1/2 \end{bmatrix} \tag{5}$$

$$Y_3 = \begin{bmatrix} 1 \\ 1 \\ 0 \end{bmatrix} \tag{6}$$

The following convolution function Y4, although it leads to the same result of the interpolation value X as that of the convolution function Y1, has a stronger low-pass filtering effects because the data at a position indicated by a circle is also given an average operation with respect to adjacent data.

$$Y_4 = \begin{bmatrix} 1/8 & 1/4 & 1/8 \\ 1/4 & 1/2 & 1/4 \\ 1/8 & 1/4 & 1/8 \end{bmatrix} \tag{7}$$

In summary, forming a two-dimensional convolution function by using an apparent luminance signal obtained from an R, G or B filter for a position indicated by a circle and a zero value for a position indicated by a cross x, corresponds to performing a two-dimensional low-pass filtering for a luminance signal.

Next, a method of obtaining each color signal will be described. With the color filter array shown in FIG. 3, the array of R filters for example becomes as indicated by a circle in FIG. 5. Therefore, there arises an issue how the R color signal at a position indicated at a cross x is interpolated. To solve this problem, in the same manner as for the luminance signal, there is formed a two-dimensional convolution function by using sampled data for a position indicated by a circle and a zero value for a position indicated by a cross x. Since it is sufficient for a color signal to have a bandwidth greatly narrower than a luminance signal, it becomes necessary to low-pass filter a color signal broadly, and the number of filter stages (dimension of a convolution function) becomes large. Such a convolution function may be:

$$C_1 = \begin{bmatrix} 1/6 & 1/3 & 1/2 & 1/3 & 1/6 \\ 1/3 & 2/3 & 1 & 2/3 & 1/3 \\ 1/6 & 1/3 & 1/2 & 1/3 & 1/6 \end{bmatrix} \quad (8)$$

The above description is also applicable to the other color signals B and G. Accordingly, a two-dimensional low-pass filtering of a color signal is performed using a convolution function such as $C_1$ by inserting actual data for a position where data are present, and a zero value for a position where data are not present.

In order to digitally realize a two-dimensional low-pass filter of N rows and m columns, a delay for $(m-1)$ pixels and $(N-1)$ memories are required. For instance, if a two-dimensional low-pass filter Y4 for a luminance signal is to be realized, two 1H memories are required, as well as six 1H memories for a color signal, totaling eight 1H memories and resulting in a problem of a considerably increased circuit scale.

The bandwidth of the low-pass filter 210 for a luminance signal is generally broader than that of the low-pass filters 205 to 207 for a color signal. In other words, if a low-pass filter is constructed of a finite response (FIR) type digital filter, the number Ny of taps of a luminance signal low-pass filter becomes smaller than the number Nc of taps of a color signal low-pass filter. Therefore, it becomes necessary to provide a delay circuit corresponding to the difference (Nc−Ny) between taps after the luminance low-pass filter to synchronize the luminance and color signals. Further, the luminance and color signal low-pass filters are generally constructed separately so that delay circuits totaling in number $(Ny-1)+(Nc-1)\times3+(Nc-Ny)$ are required, resulting in a large circuit scale.

Consider also that there are separately formed the luminance low-pass filter 210, aperture compensation filter 212 and color low-pass filters 205 to 207. Delay circuits total in number $(N1-1)+(N3-1)+3\times(N2-1)$, resulting in a large circuit scale, where N1 represents the number of taps of the luminance low-pass filter, N2 represents the number of taps of each of the color low-pass filters, and N3 represents the number of taps of the aperture compensation filter.

The problems associated with the filters have been described with respect to the horizontal direction. Similar problems arise also in the vertical direction in a two-dimensional filter. In the latter case, not only the delay circuits but also the 1H memories should be provided, thus leading to a considerable increase in apparatus cost.

SUMMARY OF THE INVENTION

It is an object of the present invention to provide a color signal processing apparatus of a simple structure capable of solving the above-described problems. It is an object of the invention to provide in particular a filter with a simplified delay circuit arrangement.

For the embodiments of the present invention, the following concept has been used. The luminance two-dimensional low-pass filter and the three color two-dimensional low-pass filters can be divided into one-dimensional low-pass filters or convolution functions, in the vertical and horizontal directions, respectively. If the low-pass filters in the vertical direction are the same, the same low-pass filtering in the vertical direction is shared and performed only once. The one-dimensional low-pass filtering in the horizontal direction is performed after the low-pass filtering in the vertical direction.

It is obvious that such sharing is allowed only for a specific color filter array on the sensor. Such sharing is allowed for the filter array shown in FIG. 3 because the same color filters are disposed at the same phase for every second line, but such sharing is not allowed for the filter array shown in FIG. 6.

For instance, the luminance low-pass filter or convolution function Y4 can be divided into the following vertical low-pass filter V and horizontal low-pass filter Hy:

$$\begin{bmatrix} 1/28 & 1/4 & 1/8 \\ 1/4 & 1/2 & 1/4 \\ 1/8 & 1/4 & 1/8 \end{bmatrix} = \begin{bmatrix} 1/2 \\ 1 \\ 1/2 \end{bmatrix} * [1/4 \; 1/2 \; 1/4] \quad (9)$$

where $$V = \begin{bmatrix} 1/2 \\ 1 \\ 1/2 \end{bmatrix} \quad H_Y = [1/4 \; 1/2 \; 1/4]$$

where * represents convolution. The color low-pass filter or convolution function $C_1$ can be also divided into convolutions V and Hc:

$$\begin{bmatrix} 1/6 & 1/3 & 1/2 & 1/3 & 1/6 \\ 1/3 & 2/3 & 1 & 2/3 & 1/3 \\ 1/6 & 1/3 & 1/2 & 1/3 & 1/6 \end{bmatrix} = \begin{bmatrix} 1/2 \\ 1 \\ 1/2 \end{bmatrix} * [1/3 \; 2/3 \; 1 \; 2/3 \; 1/3]$$

where $Hc=[\frac{1}{3} \; \frac{2}{3} \; 1 \; \frac{2}{3} \; \frac{1}{3}]$. For each of all the two-dimensional low-pass filtering, first a vertical low-pass filtering V shaped in common is performed once, and thereafter, a horizontal low-pass filtering Hy is performed for a luminance signal, and Hc for color signals, thus considerably reducing the number of necessary 1H memories to only two.

In other embodiments of this invention, the delay circuits and taps of the digital low-pass filter for signals having a broad bandwidth in the horizontal or vertical direction or in the time domain are shared with a part of the delay circuits and taps of the digital low-pass filter for signals having a narrow bandwidth in the horizontal or vertical direction or in the time domain.

With such an arrangement, since a luminance signal and a color signal are essentially multiplied upon a single signal, the delay circuits and taps for the low-pass filters for the luminance and three color signals can be shared. Further, by virtue of such sharing, the taps of the luminance low-pass filter can be shared with a part of the taps of the color low-pass filters, thus dispensing with delay circuits for synchronizing both the signals. Therefore, the number of delay circuits can be considerably reduced to only Nc.

Further, still other embodiments of the present invention have been realized paying attention to the following two points.

1) Since the luminance and color signals are essentially multiplied on a single signal, the delay circuits and taps for the luminance and color low-pass filters can be shared.
2) Further, the delay circuits and taps for the luminance low-pass filter and aperture compensation filter can also be shared.

Paying attention to the above two points, in the embodiment digital filters, the delay circuits and taps of a low-pass filter in the horizontal and/or vertical direction are shared with those of a high frequency emphasizing filter, thus allowing a considerable reduction of the number of necessary delay circuits.

The other objects and advantages of the present invention will become apparent from the following detailed description when read in conjunction with the accompanying drawings.

DETAILED DESCRIPTION OF THE PREFERRED EMBODIMENTS

Figure 1:
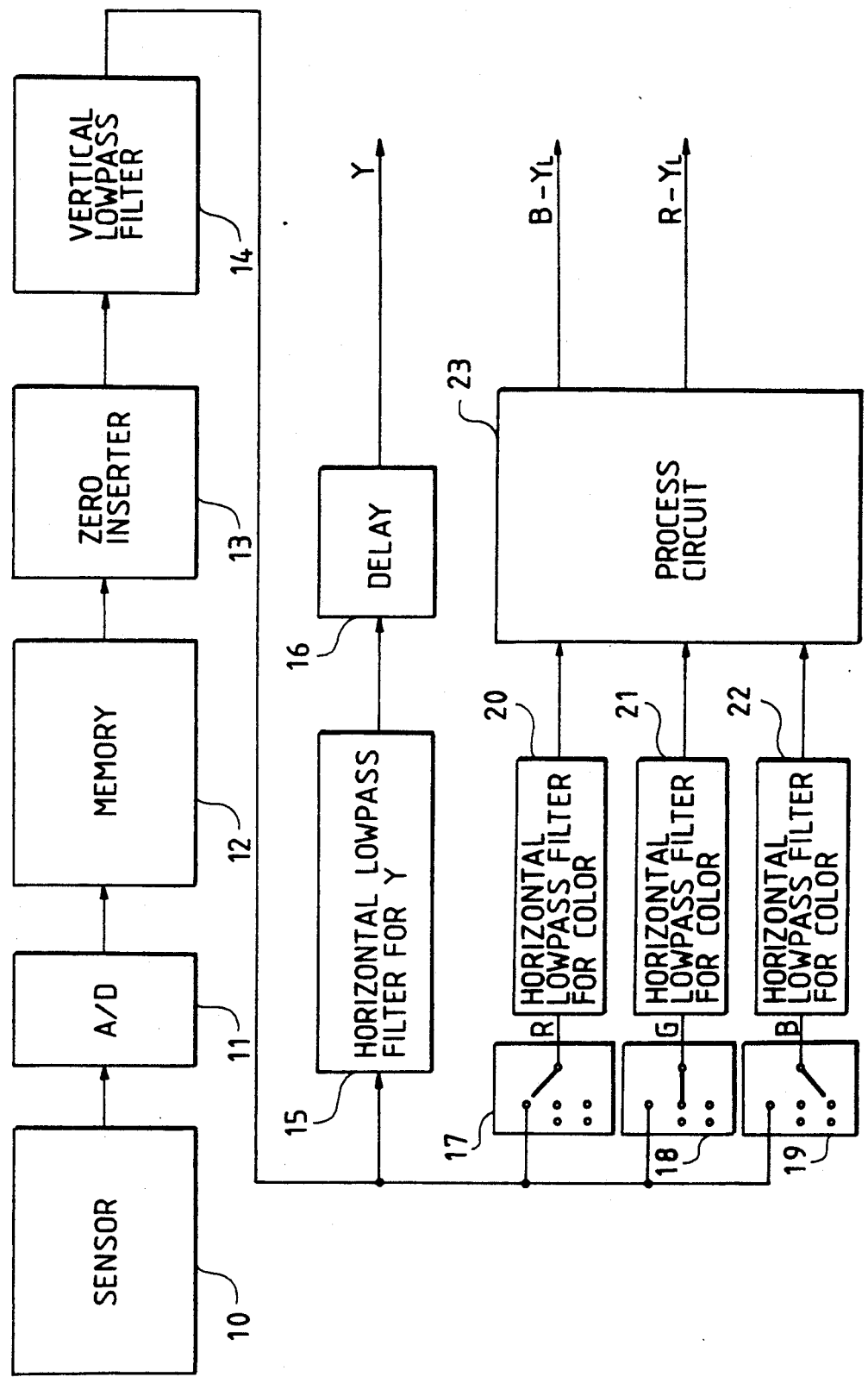
FIG. 1 is a block diagram showing an embodiment of a color signal processing apparatus according to the present invention.
Figure 3:
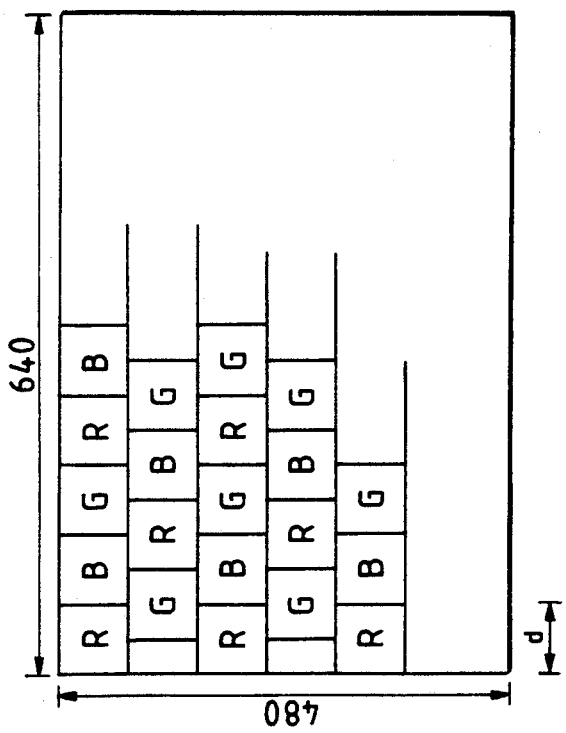
FIG. 3 is a diagram used for explaining the color sensor having an offset sampling array.
Figure 4:
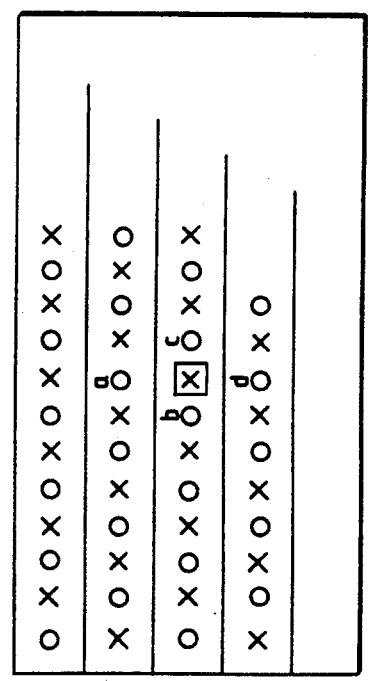

FIG. 1 shows an embodiment of the present invention. The embodiment outputs a non-interlaced signal to be used for a non-interlace television, printer and the like. Signals from a sensor 10 having 640 $\chi$ 480 pixels as shown in FIG. 3 are A/D converted at A/D converter 11 and temporarily stored in a memory 12. The signals may be read in an interlace, non-interlace, zigzag, or other various manners. It is assumed that the signals are stored in the memory 12 in the format matching the sensor structure. However, in storing signals in the memory, an offset by half a pixel is not considered. Next, data in the memory 12 are sequentially read for each line in a non-interlace manner at each 1H (about 63 microseconds), and inputted to a zero inserter 13. The zero inserter 13 alternately selects and outputs a zero signal and the data inputted thereto at a clock CLK1 having a period half that of a clock CLK0 at which a pixel is read. At adjacent lines, the zero signal and the data are reversed in their phase. The clock CLK0 is about 12 MHz.

Figure 7:
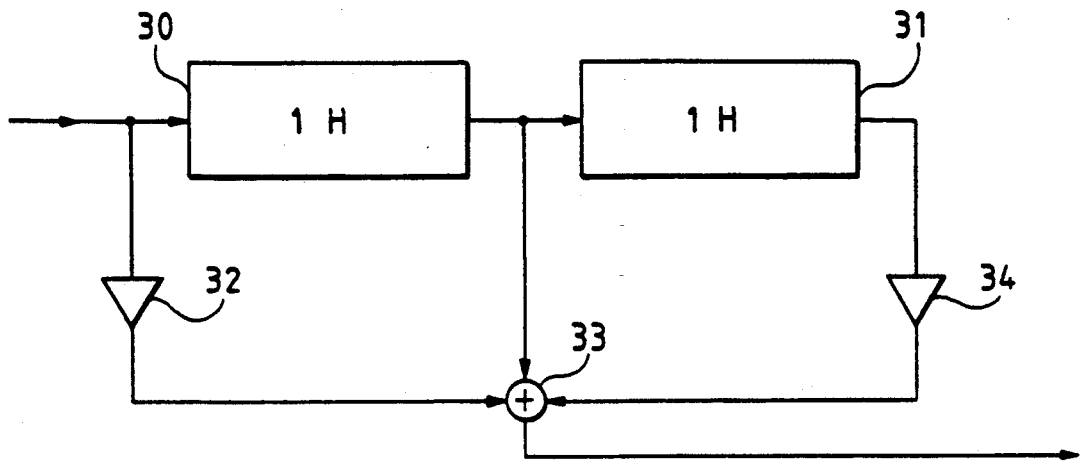
FIG. 7 is a block diagram showing the structure of a vertical low-pass filter according to the present invention.

The alternate 0 and data outputted from the zero inserter 13 at CLK1 form interpolated 1280 signals per one line. Next, the signals are inputted to a vertical low-pass filter 14 and subjected to a vertical low-pass filtering common for both the luminance and color signals. Of course, low-pass filter 14 may be a horizontal low-pass filter, in which case the low-pass filters 15, 20, 21, and 22 would be vertical low-pass filters. FIG. 7 shows the structure of the vertical low-pass filter V which is given by:

$$V = \begin{bmatrix} 1/2 \\ 1 \\ 1/2 \end{bmatrix}$$

1H memories each are constructed of a shift register of 1280 stages, the outputs from three taps are weighted by (½ 1 ½) and added together at an adder 33. A constant multiplier 32, 34 performs a simple one bit shift to the right.

Figure 8:
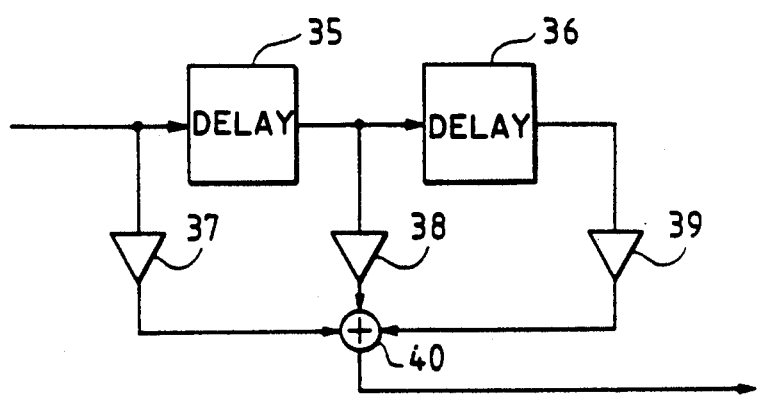
FIG. 8 is a block diagram showing the structure of a luminance low-pass filter.

(N−1) 1H memories are required where N is the number of stages of the vertical low-pass filter. The output after the common low-pass filtering is supplied to an Y horizontal low-pass filter 15 and three switches 17, 18 and 19. The Y horizontal low-pass filter 15 has the structure as shown in FIG. 8 which illustrates the above-described (¼ ½ ¼) by way of example. The outputs from three taps divided by delay circuits 35 and 36 having a delay time corresponding to one clock CLK1 are weighted by ¼ constant multipliers 37 and 39 and by a ½ constant multiplier 38, and added together at an adder 40.

The color signals are obtained as in the following. As seen from FIG. 3, the signals once subjected to the vertical low-pass filtering are disposed in the order of R, G and B at clock CLK1 in the vertical direction. The switches 17, 18 and 19 sequentially select and output a signal from the vertical low-pass filter and the two zero signals, in synchro with clock CLK1. The three R, G and B switches 17, 18 and 19 are shifted in their phase by a time corresponding to one clock CLK1. Three color horizontal low-pass filters 20, 21 and 22 perform a horizontal low-pass filtering such as the above-described (⅛ ⅜ 1 ⅜ ⅛). Similar to the case of a luminance signal, the three color horizontal low-pass filters can be realized by four delay circuits having a delay time corresponding to one clock CLK1, two ⅛ and ⅜ constant multipliers, and one adder. A constant ⅜ may be difficult to be realized in some cases so that such as (¼ ⅜ 1 ⅜ ¼) having a power of 2 denominator may be used. The RGB signals subjected to the low-pass filtering are inputted to a process circuit 23 whereat they are converted into two color difference signals B-Y1 and R-Y1. Since the color low-pass filter has generally a larger number of stages than the luminance low-pass filter, a delay circuit 16 is used to delay the Y signal to make the phases coincide with each other.

Figure 9:
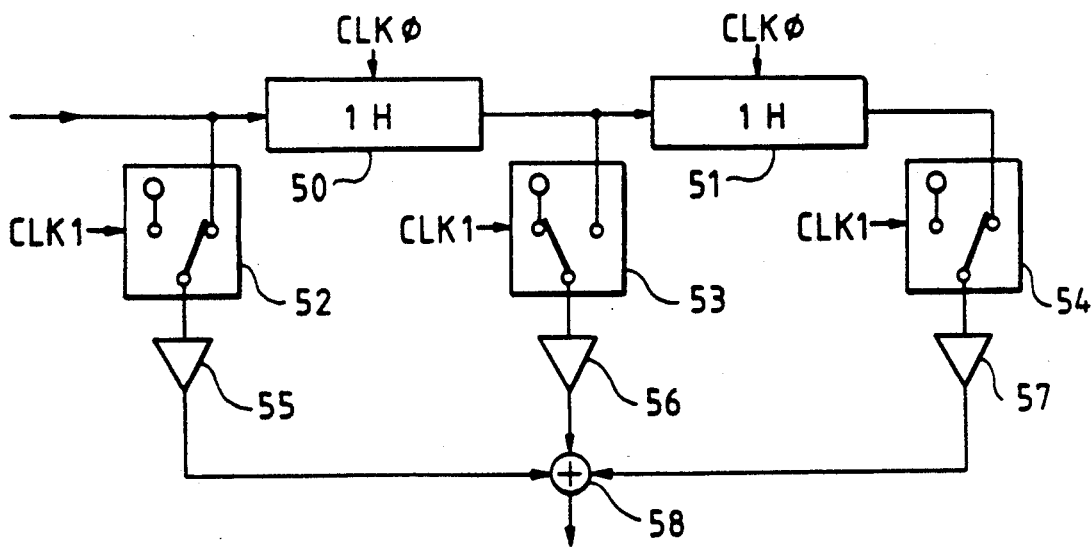
FIG. 9 is a block diagram showing another example of the structure of a vertical low-pass filter.

FIG. 9 shows another embodiment wherein the zero inserter 13 and vertical low-pass filter 14 shown in FIG. 1 are realized in a different way. Data read from the memory 12 are inputted to a 1H memory 50 constructed of a shift register of 640 stages and a switch 52. Data are shifted from 1H memories 50 and 51 in synchro with clock CLK0 the same as used when reading the memory 14. Switches 52, 53 and 54 alternately select and output a zero signal and the data at a clock frequency CLK1 having a period half that of CLK0. Since data are offset for each line, the order in selecting a zero signal and the data by the odd number switches 52 and 54 and the even number switch 53 is reversed. The outputs from taps are weighted properly by constant multipliers 55, 56 and 57 and added together at an adder 58. With this method, the number of stages of the 1H memory shift register is halved as compared with the first embodiment, thus further reducing a circuit scale.

Figure 10:
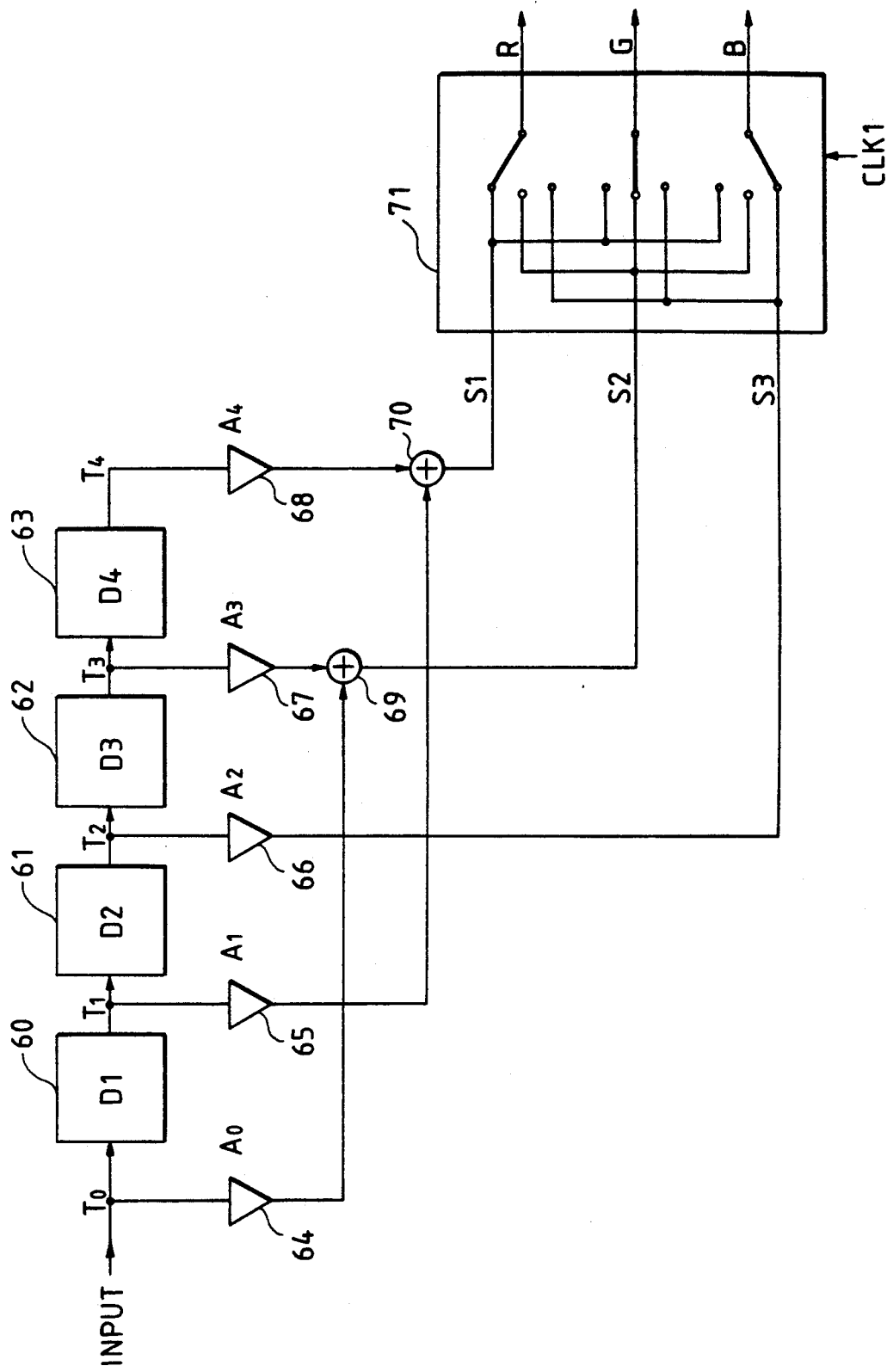
FIG. 10 is a block diagram showing another example of the structure of a color low-pass filter.

FIG. 10 shows another embodiment for the three switches 17, 18 and 19 and color low-pass filters 20, 21 and 22 shown in FIG. 1. As described previously, the outputs from the vertical low-pass filter are disposed repetitively in the order of R, G and B data. The outputs are supplied to an input terminal T0 shown in FIG. 10. There are disposed delay circuits 60, 61, 62 and 63 for one clock delay and constant multipliers 64, 65, 66, 67 and 68 whose multiplication factors are ⅛, ⅜, 1, ⅜, and ⅛, respectively.

The operation of the color horizontal low-pass filter Hc=(⅛ ⅜ 1 ⅜ ⅛) described with the method as in FIG. 1 will be considered.

An input to a color (e.g., R) low-pass filter 20 is an output from the switch 17 shown in FIG. 1, which output is Ri, 0, 0, Ri+1, 0, 0, Ri+2, 0, 0, and so on. Data is present once per three signals, and a zero signal twice per three signals. Therefore, an output from the low-pass filter 20 becomes a repetition of [Ri, ⅜ Ri+⅛ Ri+1, ⅛ Ri+⅜ Ri+1] where i is an integer.

Assuming that a first Ri is inputted to the input terminal T0 shown in FIG. 10 at time t0. Bi−1, Gi−1, Ri−1 and Bi−2 are outputted at taps T1, T2, T3 and T4, respectively. Therefore, outputted are ⅛ Ri+⅜ Ri−1 at S2, ⅛ Bi−2+⅜ Bi−1 at S1, and Gi−1 at S3. At time t1 one clock after t0, an output at T0 becomes Gi so that ⅛ Gi+⅜ Gi−1 is outputted at S2, and ⅛ Ri−1+⅜ Ri at S1. At the next time t2, an output at T0 becomes Bi so that ⅛ Bi+⅜ Bi−1 is outputted at S2, ⅜ Gi+⅛ Gi−1 at S1, and Ri at S3.

Consequently, if a switch 71 is operated so as to select a color (e.g., R) signal such that a signal at S2 is outputted at time t0, S1 at time t1, S3 at time t2 and so on, then the outputted signal is in the order of ⅛ Ri+⅜ Ri−1, ⅜ Ri−1+⅛ Ri, and Ri. This corresponds to the operation of the color (R) low-pass filter shown in FIG. 1. The same is true for the other colors.

Although the first embodiment requires three digital filters each constructed of five taps, five constant multipliers and one adder, this embodiment effectively performs a low-pass filtering by using a single digital filter constructed of five taps, five constant multipliers and three adders. Even if a larger number of taps are required, the output from a (3i+1)-th tap is supplied to the first adder, the output from a (3i+2)-th tap to the second adder, and the output from a (3i)-th tap to the third adder. Such an arrangement is also applicable to an ordinary one-dimensional stripe filter structure because the signals are disposed in the order of R, G and B.

Figures 11, 12:
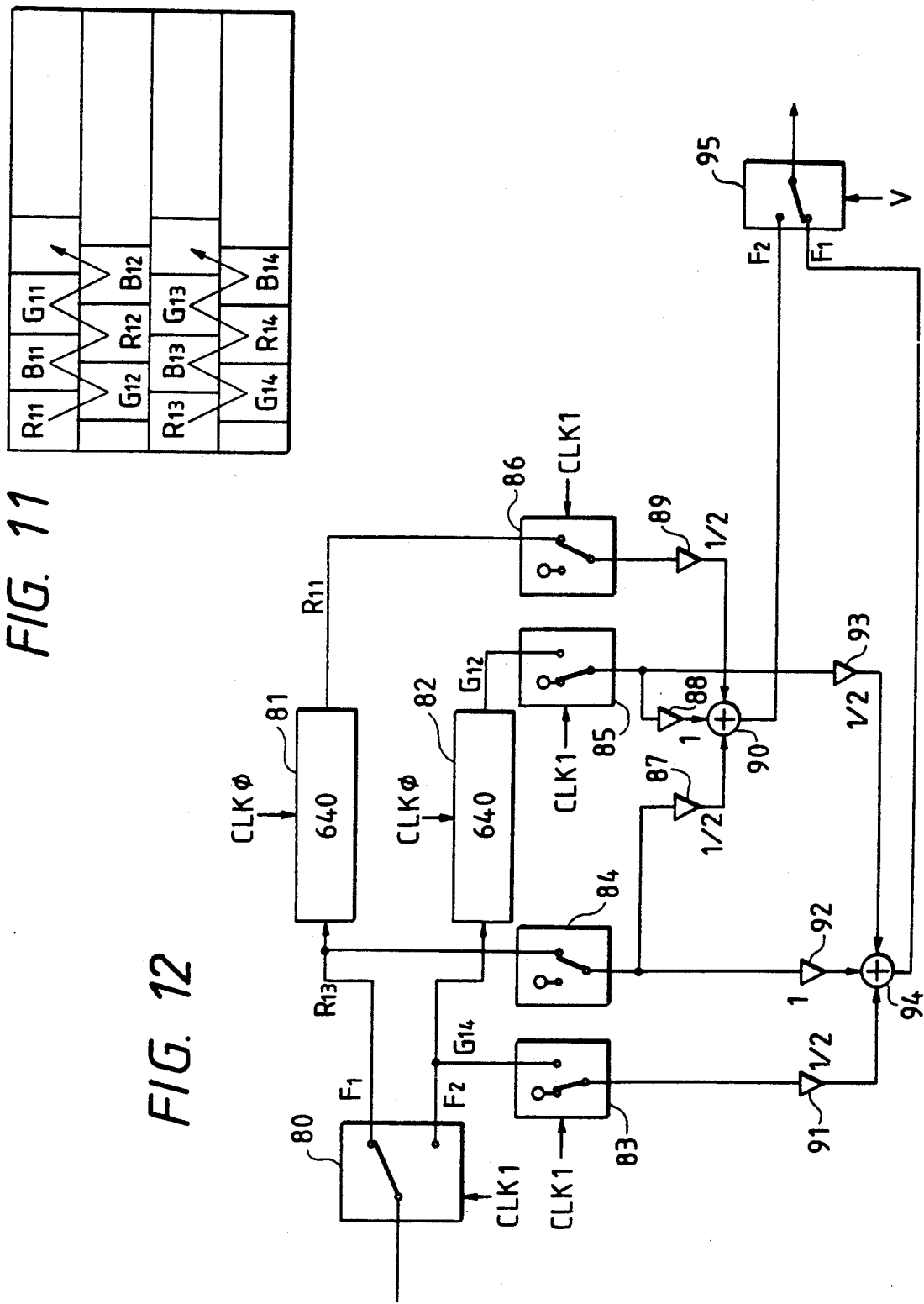
FIG. 11 is a block diagram illustrating how a memory is read.
FIG. 12 is a block diagram showing the structure of a vertical low-pass filter for interlacing.

FIG. 12 shows another embodiment where an interlace signal is used. It is assumed that the information from the sensor is stored in a zigzag form in a memory as shown in FIG. 11. The structure of the memory is preferably 1280×240 instead of 640×480. Data of 1280 signals for one line read out in a zigzag form at clock CLK1 are inputted to a switch 80. The period of CLK1 is about 24 MHz. The switch 80 switches the data between F1 and F2 in synchro with CLK1. Shift registers each of 640 stages are connected to F1 and F2 which registers operate in synchro with CLK0. CLK0 has a two-bold period of CLK1, i.e. about 12 MHz. Consider now an input to the shift register 81 is R13, then an output therefrom is R11 and that from the shift register 82 is G12. At this time, switches 83, 84, 85 and 86 which output alternately a data and a zero signal are set as shown in FIG. 12. Reference numerals 88, 89, 91 and 93 represent a ½ constant multiplier, and reference numerals 87 and 92 indicating a constant multiplier may not be a 1 constant multiplier. The output F1 from an adder 94 is R13, and the output F2 from an adder 90 is ½ R11+½ R13.

At the next clock CLK1, the states of the switches 83, 84, 85 and 86 are changed, with the output from the shift register maintained as it is. Therefore, ½ G12+½ G14 is outputted at F1, and G12 is outputted at F2. By changing the state of a switch 95 between F1 and F2 for each 1V (one field), the above-described common vertical low-pass filtering V can be performed in an interlaced manner. The remaining circuit portion is constructed the same as that of FIG. 1. If data are arranged to be supplied in real time directly from a sensor without using the memory, the real time interlaced scan can be performed in the similar manner as described above.

An example of the combination of a luminance low-pass filter and color low-pass filters has been described using the filters Y4 and C1. However, any other combination can be used in principle on condition that the combination can be divided into a vertical low-pass filter and horizontal low-pass filter, and that the divided vertical low pass-filter can be shared with a part of the divided horizontal low-pass filter. For instance, the following combination of luminance and color filters may be used:

$$\begin{bmatrix} 1 \\ 1 \\ 0 \end{bmatrix} * [1/4 \ 1/2 \ 1/4] = \begin{bmatrix} 1/4 & 1/2 & 1/4 \\ 1/4 & 1/2 & 1/4 \\ 0 & 0 & 0 \end{bmatrix}$$

for luminance, $$\begin{bmatrix} 1 \\ 1 \\ 0 \end{bmatrix} * [1/3 \ 2/3 \ 1 \ 2/3 \ 1/3] = \begin{bmatrix} 1/3 & 2/3 & 1 & 2/3 & 1/3 \\ 1/3 & 2/3 & 1 & 2/3 & 1/3 \\ 0 & 0 & 0 & 0 & 0 \end{bmatrix}$$

for color.

In order to have a constant average luminance, it is preferable to set the sum of components at a vertical low-pass filter at 2, and the sum of components of a horizontal low-pass filter at 1 for a luminance signal and 3 for a color signal.

Although a digital processing has been described in the foregoing, if a digital delay circuit is changed to a 1H delay line, it is obvious that the present invention can be effective also for analog processing.

Further, an RGB signal has been described by way of example in the foregoing. However, even for the case of a complementary stripe using Cy, Ye and G, after calculations of R=Ye-G, B=Cy-G, and G=G, the succeeding processing is the same, thus allowing effective application of this invention.

According to the above-described embodiments of this invention, a part of the vertical low-pass filter for the luminance low-pass filter and color low-pass filter is shared in use so that the number of 1H memories and hence the circuit scale can be reduced considerably. Further, the outputs of three color low-pass filters are collected at every fourth tap so that they can be realized with a single low-pass filter, thus reducing a circuit scale.

Figure 2:
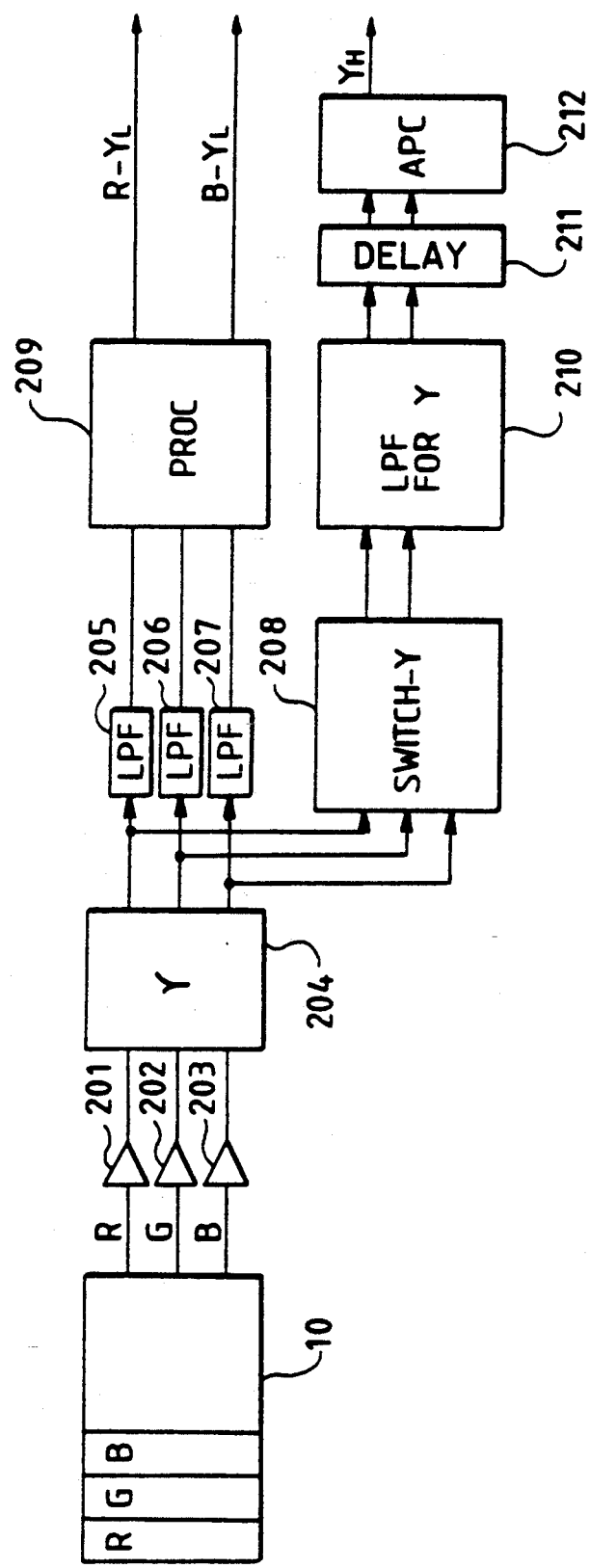
FIG. 2 is a block diagram showing a conventional color signal processing apparatus of an RGB stripe filter type.
Figure 5:
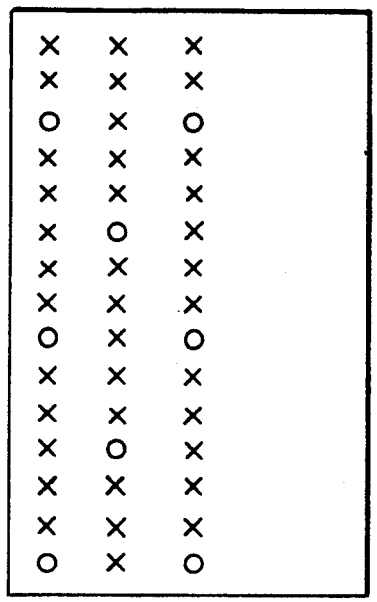
FIGS. 4 and 5 are diagrams used for explaining the luminance and color low-pass filtering according to the present invention.
Figure 6:
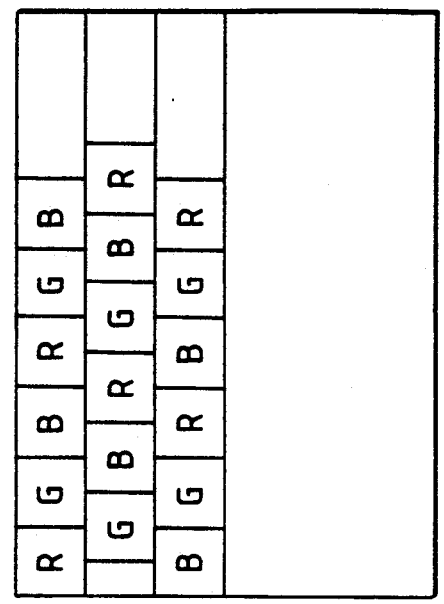
FIG. 6 is a diagram showing an example of a color filter array to which the present invention is not applicable.
Figure 13:
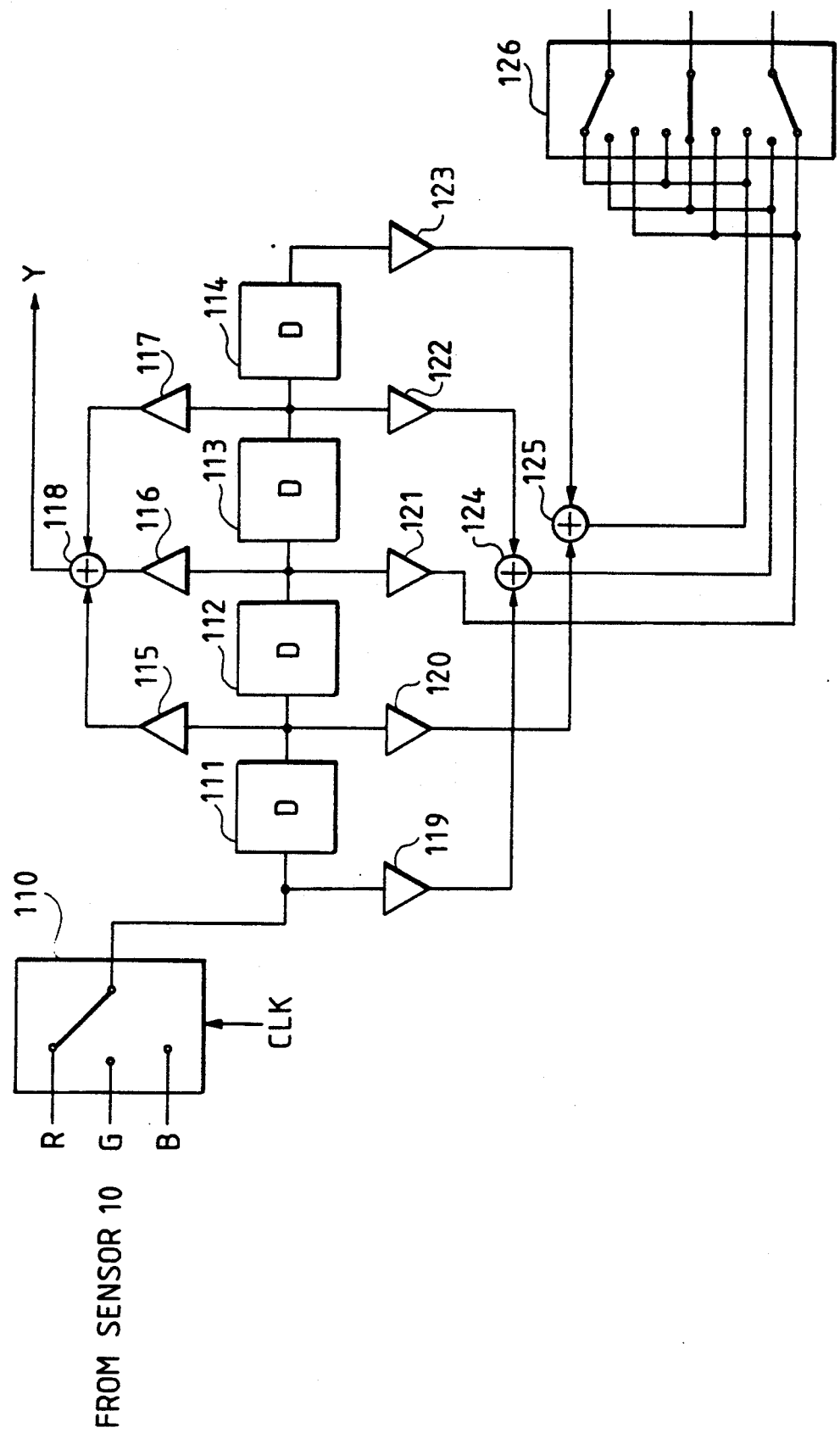
FIG. 13 is a block diagram showing a second embodiment of a stripe filter type single-plate color camera according to the present invention.
Figure 14:
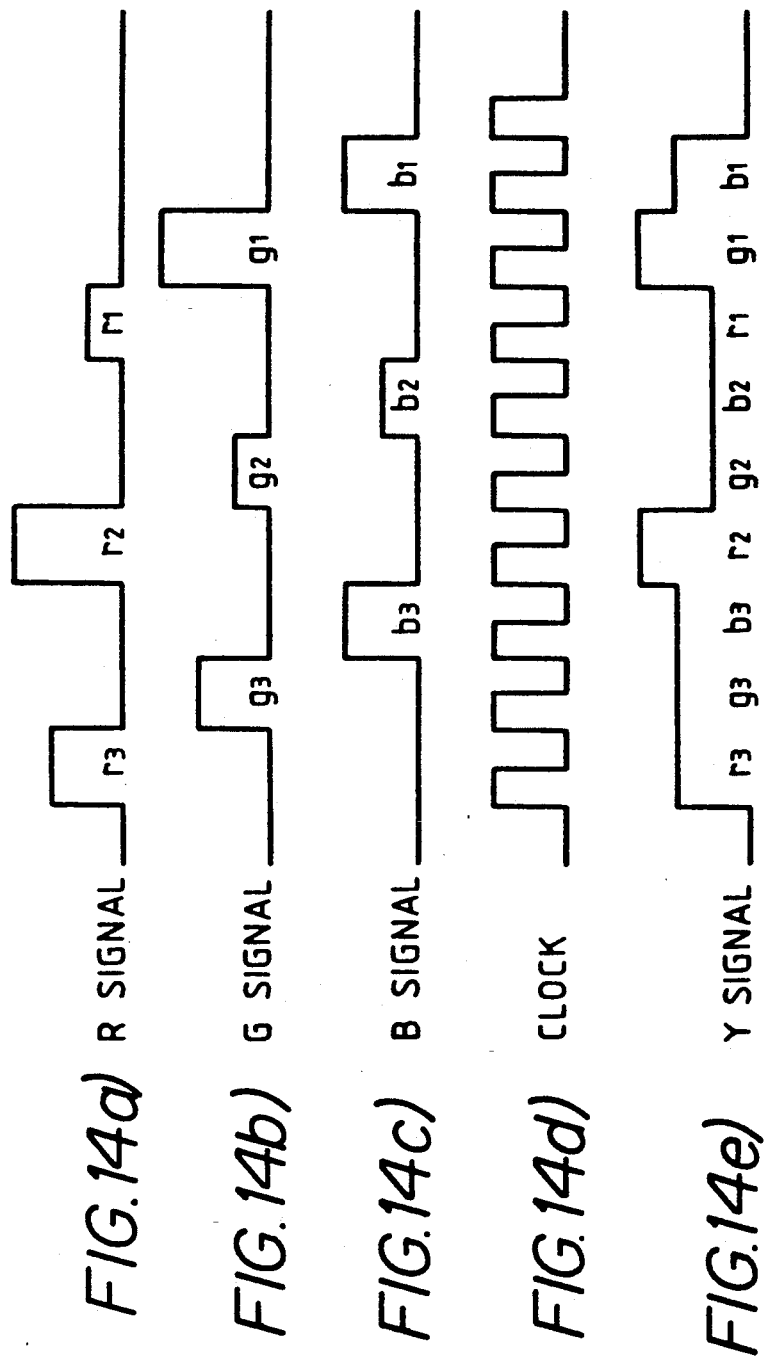
FIGS. 14a)–14e) are timing charts for signals shown in FIG. 13.

Next, a second embodiment shown in FIG. 13 of the luminance and color low-pass filters according to the present invention will be described. Consider a sensor with a stripe filter array as shown in FIG. 2. R, G and B input signals provided to a switch 110 have their phase shifted by one clock from each other as shown in FIGS. 14 (a), (b) and (c), and have a duty ratio of $\frac{1}{3}$. The clock here used is the same clock for reading a pixel from the sensor. The switch 110 selects R, G and B signals in synchro with the clock for outputting a luminance signal as shown in FIG. 14(e). An output signal from the switch 110 is inputted to a low-pass filter constructed of four delay circuits 111, 112, 113 and 114. The constants of constant multipliers 115, 116 and 117 are $\frac{1}{4}$, $\frac{1}{2}$ and $\frac{1}{4}$, respectively, and the constants of constant mulitpliers 119, 120, 121, 122 and 123 are $\frac{1}{3}$, $\frac{2}{3}$, 1, $\frac{2}{3}$ and $\frac{1}{3}$, respectively.

Assuming that an output from the switch 110 is g2 for example at time t1, the outputs of the delay circuits 111, 112, 113 and 114 are b2, r1, g1 and b1. Therefore, an output of an adder 118 becomes $\frac{1}{4}$ b2+$\frac{1}{2}$ r1+$\frac{1}{4}$ g1. An output of an adder 124 becomes $\frac{1}{3}$ g2+$\frac{2}{3}$ g1, an output of an adder 125 becomes $\frac{1}{3}$ b2+$\frac{2}{3}$ b1, and an output of the constant multiplier 121 becomes r1.

At the next clock, an output of the switch 110 becomes r2 so that $\frac{1}{3}$ g2+$\frac{1}{3}$ b2+$\frac{1}{3}$ ri is outputted from the adder 118, $\frac{1}{3}$ r2+$\frac{2}{3}$ r1 from the adder 124, $\frac{1}{3}$ g2+$\frac{2}{3}$ g1 from the adder 125, and b2 from the constant multiplier 121.

Upon repetition of the similar operations, low-pass filtered R, G and B signals are alternately outputted from the adders 124 and 125 and constant multiplier 121. The low-pass filtered R, G and B signals are separately obtained upon selection at a switch 126 in synchro with the clock. Such outputs have been obtained heretofore through a filtering process with three low-pass filters of, e.g., Hc=[$\frac{1}{3}$ $\frac{2}{3}$ 1 $\frac{2}{3}$ $\frac{1}{3}$]. However, this embodiment obtains such outputs with only four delay circuits.

Also, the same luminance signal obtained heretofore through a filtering process with a low pass filter of, e.g., Hy=[$\frac{1}{4}$ $\frac{1}{2}$ $\frac{1}{4}$] can be obtained as having no time delay relative to the color signal. Therefore, a delay circuit for synchronizing the luminance signal with the color signal can be dispensed with.

In the above embodiment, the number of taps of the color low-pass filter is five. Even if a larger number of taps are used, the three color low-pass filters can be shared by collectively adding the outputs at every fourth tap.

Further, since the luminance low-pass filter is shared with a part of the color low-pass filter, luminance and color signals with the same phase can be obtained. Assuming that the number of taps of the luminance low-pass filter is 21c+1, and that of the color low-pass filter is 21y+1, the (1c+1)-th tap of the color low-pass filter is commonly used with the (1y+1)-th tap of the luminance low-pass filter. Similarly, assuming that the number of taps of the color low-pass filter is 21c, and that of the luminance low-pass filter is 21y, the 1c-th tap of the color low-pass filter is commonly used with the 1y-th tap of the luminance low-pass filter.

In the above embodiment, R, G and B signals are separately read from the sensor. However, if R, G and B signals are read as a single serial signal in the order of R, G and B, the switch 110 is not needed resulting in a more simple circuit arrangement.

Figure 15:
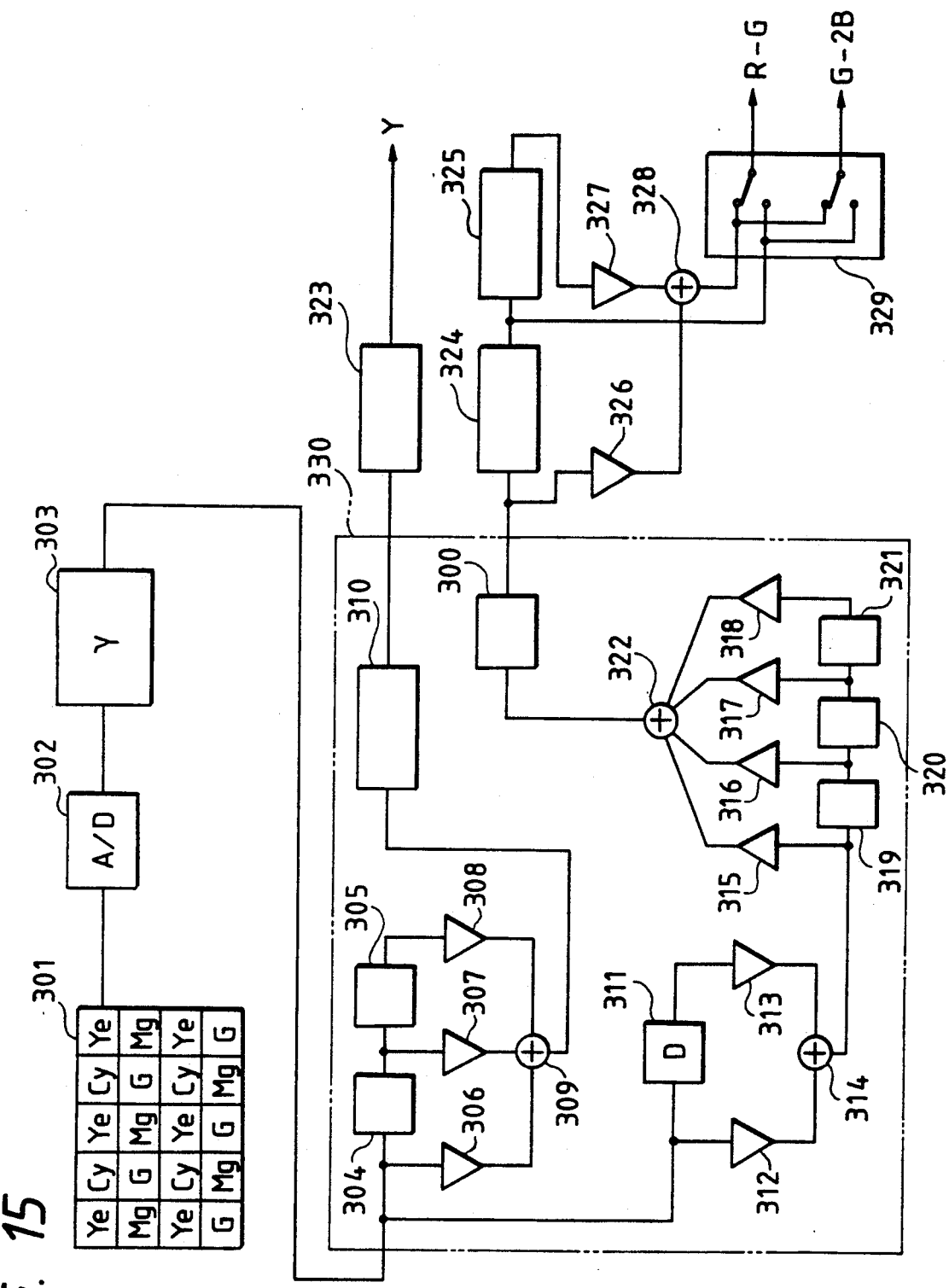
FIG. 15 is a block diagram showing a third embodiment of a mosaic type single-plate color camera according to the present invention.

A third embodiment of this invention uses a sensor having a mosaic type color filter array. FIG. 15 is a block diagram of a signal processing circuit of the sensor with a mosaic type color filter array.

Figure 16:
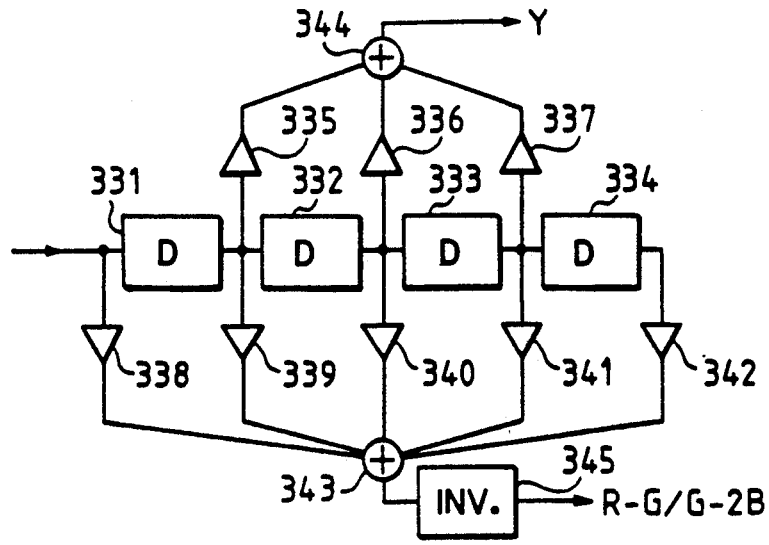
FIG. 16 shows the structure of a mosaic type single-plate color camera.

FIG. 16 shows a block diagram of a horizontal low-pass filter shown in FIG. 15 which will be later described.

Referring to FIG. 15, with the color filter array of a sensor 301, during the reading of a first field, the (2i-1)-th line and 2i-th line are added, e.g., within the CCD) and read out, and during the reading of a second field, the 2i-th line and (2i+1)-th line are added and read out. Therefore, for both the fields, (Ye+Mg) and (Cy+G) signals are alternately read at an odd number line at each clock, whereas at an even number line (Ye+G) and (Cy+Mg) signals are alternately read. The signals are A/D converted at an A/D converter 302 and gamma-converted at a gamma converter 303.

A luminance signal is subjected to a low-pass filtering at a low-pass filter constructed of delay circuits 304 and 305, constant multipliers 306, 307 and 308, and an adder 309. Therefore, the luminance signal becomes about (Mg+Cy+Ye+G)/4 at odd and even lines in the first and second fields.

Adjacent signals are subtracted from each other for obtaining a color difference signal, which is realized with a delay circuit 311, (−1) constant multiplier 312 and (+1) constant multiplier 313 and adder 314. (Ye+Mg)−(Cy+G)=R−G signal at an odd line and (Ye+G)−(Cy+Mg)=G−2B signal at an even line are alternately inverted and outputted from the adder 314. This signal is inputted to a 4-tap low-pass filter constructed of delay circuits 319, 320 and 321, constant multipliers 315, 316, 317 and 318, and an adder 322.

If a filtering of, e.g., Hc=($\frac{1}{4}$ $\frac{1}{4}$ $\frac{1}{4}$ $\frac{1}{4}$) is to be performed, the constant multipliers 315 and 318 are set at $-\frac{1}{4}$, and the constant multipliers 316 and 317 are set at $\frac{1}{4}$. The reason for this is that the output from the adder 314 is inverted at each clock. Since the center of the signal is shifted by half the pixel due to the subtraction operation, it is desirable that the number of taps of the color low-pass filter be set at an even number because the shift is compensated, on condition that the number of taps of the luminance low-pass filter is an odd number. If the number of taps of the luminance low-pass filter is an even number, it is desirable that the number of taps of the color low-pass filter be set at an odd number. The luminance signal is delayed by about two clocks at a delay circuit 310 to make it synchronous with the color signal. The color signal changes its sign at each pixel and at each line so that the sign is adjusted at a sign inverter 300. Specifically, the positive sign is given for an odd number signal at an odd number line and for an even number signal at an even number line, and the negative sign is given to the other signals.

The above operation is carried out at a horizontal low-pass filter unit 330.

Since a color difference signal is a line sequential signal, an interpolation signal at 1H delay circuits 324 and 325 and an output from the 1H delay circuit 324 are alternately selected at a switch 329 to obtain synchronized color difference signals R-G and G-2B. A 1H delay circuit 323 is used for phase alignment of a luminance signal in the vertical direction.

The horizontal low-pass filter unit 330 shown in FIG. 15 is constructed as shown in FIG. 16 in accordance with the present invention. First, a luminance signal is subjected to a low-pass filtering at a low-pass filter constructed of delay circuits 332 and 333, constant multipliers 335, 336 and 337, and an adder 344. As apparent from the operation described with FIG. 15, a color signal is subjected to two convolutions Hc1=(−1 1) and Hc2=(−$\frac{1}{2}$ $\frac{1}{2}$ −$\frac{1}{2}$ $\frac{1}{2}$) corresponding to one filtering process of Hc1 Hc2=(−$\frac{1}{2}$ $\frac{1}{2}$ −$\frac{1}{2}$ $\frac{1}{2}$).

The constant multipliers 338 and 342 are set at $-\frac{1}{4}$, the constant multipliers 339 and 341 at $\frac{1}{4}$, and the constant multiplier 340 at $-\frac{1}{2}$. The output from the adder 343 is the same as that obtained in FIG. 15 with the polarity of the coefficient being changed from + to − alternately. The above description applies to an even number of taps. An odd number is also applicable in the same manner as described with the second embodiment. The operation of a sign inverter 345 is the same as that of the sign inverter 300 shown in FIG. 15.

Figure 17:
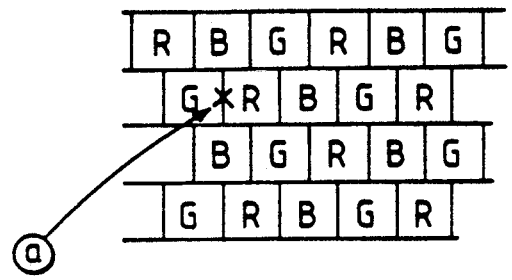
FIG. 17 is a diagram used for explaining a color sensor having an offset sampling array according to a fourth embodiment of this invention.

Next, a fourth embodiment will be described wherein the invention is applied to a color sensor having an offset sampling array as shown in FIG. 17.

With the array shown in FIG. 17, information at the intermediate point between pixels indicated at (a) is interpolated by using upper and lower pixels. Since the same color filter is disposed at every second line in the vertical direction, R, G and B signals in this order recited are disposed at each line in the horizontal direction after interpolation. At this stage, the processing described with the first embodiment is performed. Similar conditions are used for the vertical direction. For instance, the luminance data at the point (a) are interpolated using one upper pixel and one lower pixel, whereas the color data at the point (a) for B are interpolated using two upper pixels and two lower pixels. Then, the luminance vertical low-pass filter in the vertical direction uses, for example, $$V_Y = \begin{bmatrix} 1/2 \\ 1 \\ 1/2 \end{bmatrix}$$

and the color vertical low-pass filter in the vertical direction uses, for example, $$V_C = \begin{bmatrix} 1/8 \\ 3/8 \\ 1 \\ 3/8 \\ 1/8 \end{bmatrix}$$

Figure 18:
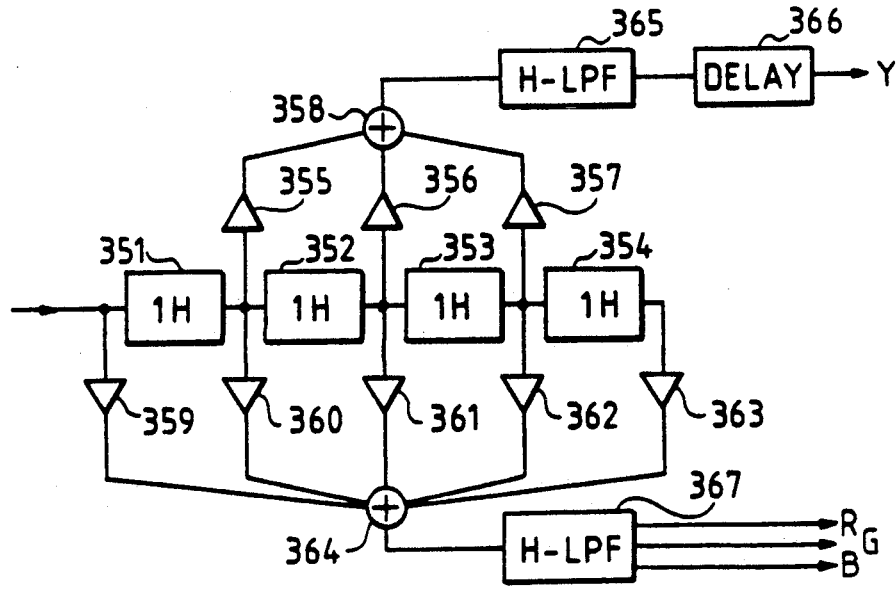
FIG. 18 is a block diagram illustrating a circuit arrangement for the vertical direction according to the present invention.

Such a low-pass filter in the vertical direct has conventionally uses two 1H memories for a luminance signal, four 1H memory for a color signal, and in addition two 1H memories at the luminance signal side for phase alignment between the luminance signal and color signal in the vertical direction. FIG. 18 is a block diagram showing the circuit arrangement wherein the 1H memory and taps of the luminance vertical low-pass filter is shared with a part of the 1H memory and taps of the color vertical low-pass filter. It is sufficient for this arrangement only to replace the delay circuit for one pixel in the above-described two embodiments with a 1H memory. However, a color low-pass filter uses the same arrangement as shown in FIG. 2.

A further consideration of the above concept leads to an applicability of this concept also to a low-pass filtering in the time axis direction by changing the delay circuit in the above embodiment into a 1V field memory or frame memory.

According to the second to fourth embodiments of this invention, the delay circuits and taps of a luminance low-pass filter are shared with a part of the delay circuits and taps of a color low-pass filter in the horizontal or vertical direction, thus resulting in a considerable reduction of circuit scale. The present invention is applicable to both the stripe filter and mosaic filter, and to a single-plate type sensor with a so-called offset sampling array.

In the above description, a luminance signal of a single-plate color camera has been used as a wideband signal in the horizontal and vertical direction, and an associated color signal as a narrow band signal. However, any other luminance and color signals such as for a digital television or digital VTRs may also be used on condition that they are related to each other in the manner described previously.

Figure 19:
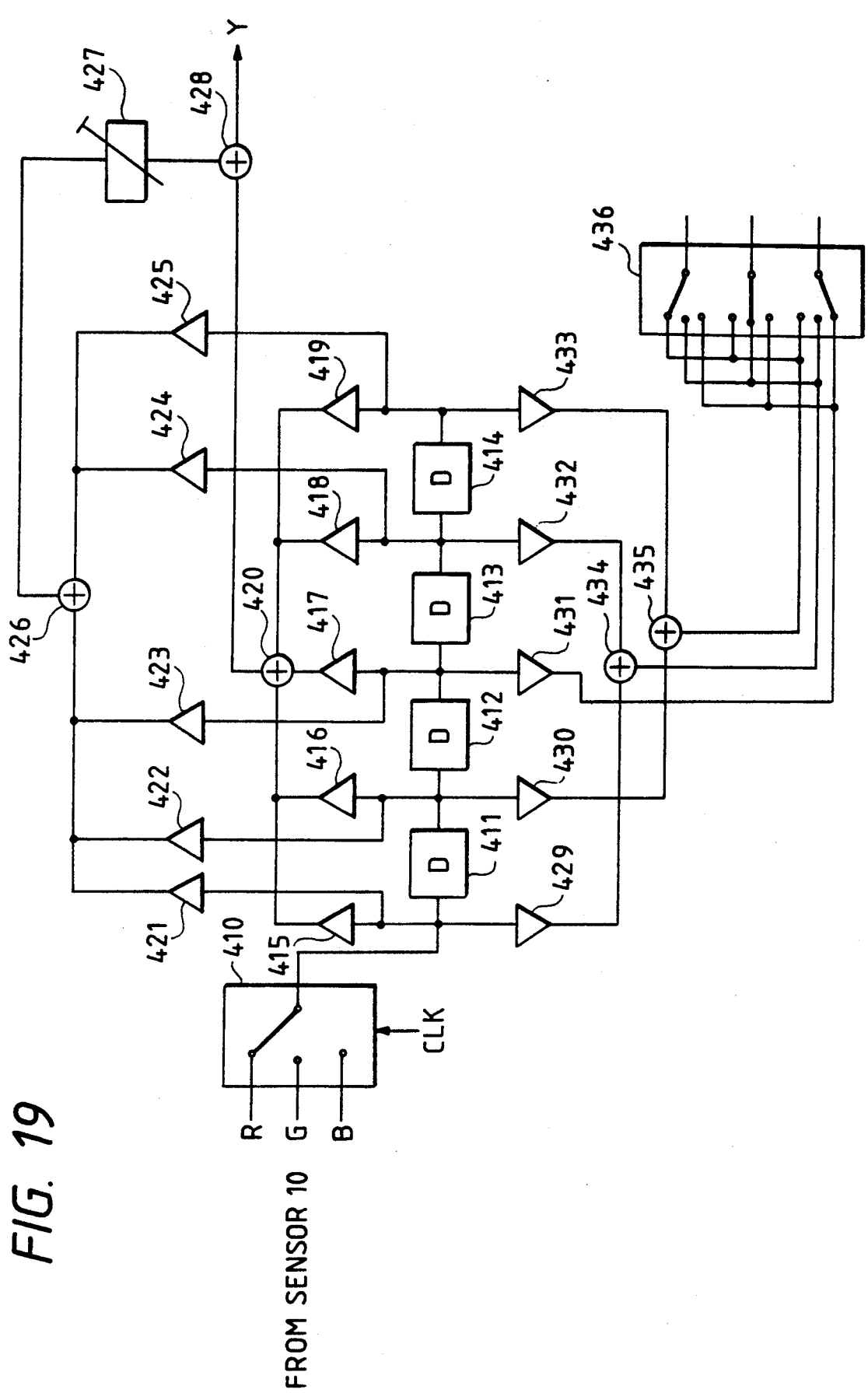
FIG. 19 is a block diagram showing a fifth embodiment of a stripe filter type single-plate color camera according to the present invention.
Figure 20:
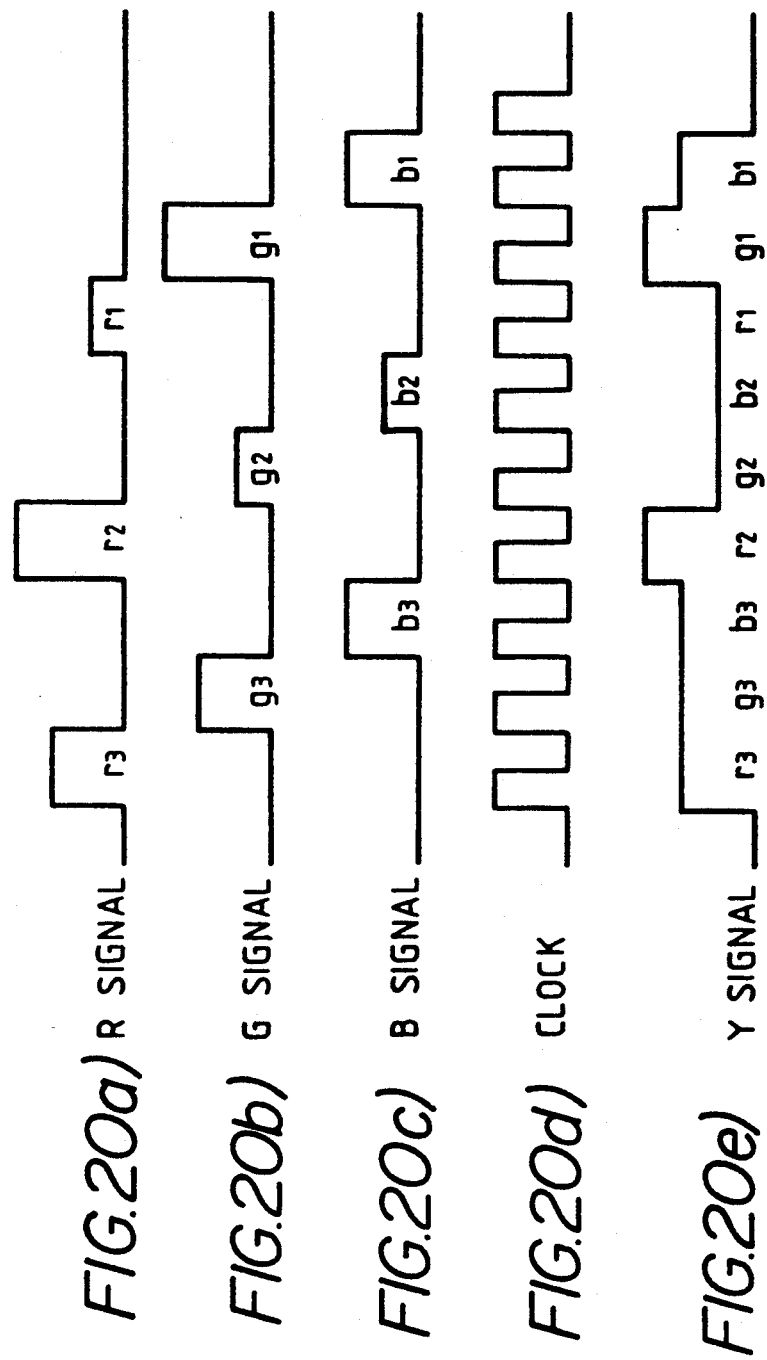
FIGS. 20a)–20e) are timing charts illustrating signals shown in FIG. 19.

FIG. 19 shows a fifth embodiment of luminance and color low-pass filters of this invention, and FIGS. 20a-)–20e) show waveforms of main signals in FIG. 19.

Consider now a stripe sensor as shown in FIG. 2, R, G and B inputs signals to a switch 410 which are shifted in their phase by one clock from each other as shown in FIGS. 20(a), (b) and (c), one signal being present per three clocks and a zero signal being outputted at the other period. The clock herein used is the same clock for reading the pixel. The switch 410 alternately selects R, G and B signals in synchro with the clock for output of a luminance signal as shown in FIG. 20(e). The luminance signal is subjected to a common filter constructed of four delay circuits 411, 412, 413 and 414.

Constant multipliers 415, 416, 417, 418 and 419 respectively set at 0¼, ½, ½ and 0 and an adder 420 constitute a low-pass filter. Constant multipliers 421, 422, 423, 424 and 425 respectively set at −¼, −¼, 1, −¼, and −¼ and an adder 426 constitute a luminance wideband band-pass filter which may obviously be a high-pass filter. A high frequency component of a luminance signal outputted from the adder 426 is multiplied at a variable constant multiplier 427 and added to a low-pass filtered luminance signal at an adder 428 to obtain a final luminance signal. The variable of the variable constant multiplier 427 is externally controllable with an operation switch or the like to adjust the degree of high frequency emphasis.

Next, a color low-pass filter will be described. Constant multipliers 429, 430, 431, 432 and 433 are set at ¼, ¾, 1, ¾ and ¼, respectively. An output of the switch 410 is assumed to be g2 for example at a time t1. The outputs of the delay circuits 411, 412, 413 and 414 become b2, r1, g and b1. Therefore, the output of an adder 434 becomes ¼ g2 + ¾ g1, the output of an adder 435 ¼ b2 + ¾ b, and the output of a constant multiplier 431 r1. When the output of the switch 410 becomes r2 at the next clock, the adder 434 outputs ¼ r2 + ¾ r1, the adder 435 ¾ g2 + ¼ g1, and the constant multiplier 431 b2.

Upon repetition of the similar operation, R, G and B low-pass filtered signals are alternately outputted at the adders 434 and 435 and constant multiplier 431. Therefore, R, G and B low-pass filtered signals can be separately outputted upon selection at a switch 436 at each clock.

The same outputs obtained through separate filtering of R, G and B by using three low-pass filters Hc=[¼ ¾ 1 ¾ ¼] can be obtained with the above circuit arrangement.

As described so far, according to the fifth embodiment of this invention, the luminance low-pass filter, aperture compensation band-pass or high-pass filter, and color low-pass filter all share the delay circuits and taps, thus reducing the number of necessary delay circuits greatly.

In the above description, the constant multipliers 415 and 419 have been set at 0. However, another constant such as a negative constant may be set to obtain a desired characteristics of the luminance low-pass filter. Further, although five taps have been used for the color low-pass filter, a larger number of taps may be used such that the outputs at every fourth tap are collectively added at an adder to thus realize a shared use for the three color low-pass filters.

R, G and B signals have been described as being outputted independently from the sensor. However, the invention is also applicable to the case where R, G and B signals can be read directly from the sensor as a serial single signal of R, G and B in this order, without necessitating the switch 410.

Figure 21:
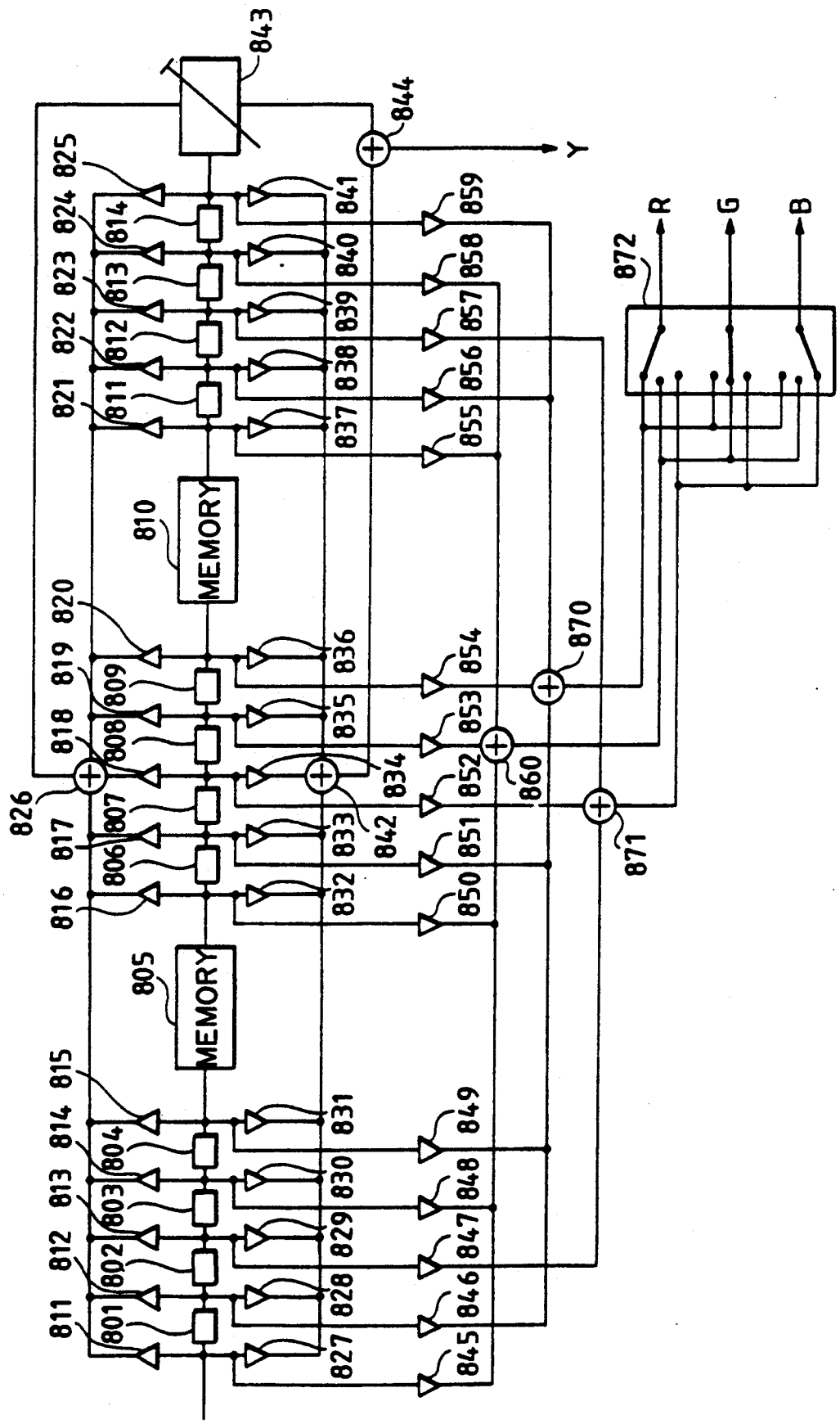
FIG. 21 is a block diagram showing a sixth embodiment where the invention is practiced using a two-dimensional filter.

The above concept can be developed not only for one-dimension in the horizontal direction but also for two-dimensions, in the horizontal and vertical directions. In such a case, an output of the switch 410 shown in FIG. 19 is inputted to a common two-dimensional filter shown in FIG. 21. In FIG. 21, reference numerals 801 to 804, 806 to 809 and 811 to 814 represent a delay circuit for one pixel, and reference numerals 805 and 810 represent a 1H memory constructed of a shift register of (pixel number in the horizontal direction −4) stages. Specifically, an input to the delay circuit 811 is delayed by 2H from the input to the delay circuit 801 and by 1H from the input to the delay circuit 806. Constant multipliers 811 to 815, 816 to 820 and 821 to 825 respectively set at, e.g., (0, −⅛, −¼, −⅛, 0), (−⅛, −¼, 7/4, −¼, −⅛) and (0, −⅛, −¼, −⅛, 0) and an adder 826 constitute a two-dimensional high-pass filter which is given by:

$$\begin{bmatrix} 0 & -1/8 & -1/4 & -1/8 & 0 \\ -1/8 & -1/4 & 7/4 & -1/4 & -1/8 \\ 0 & -1/8 & -1/4 & -1/8 & 0 \end{bmatrix}$$

Constant multipliers 827 to 831, 832 to 836 and 837 to 841 respectively set at, e.g., (1/32, 1/32, ⅛, 1/32, 1/32), (1/16, 1/16, ¼, 1/16, 1/16) and (1/32, 1/32, ⅛, 1/32, 1/32) and an adder 842 constitute a color two-dimensional low-pass filter which is given by:

$$\begin{bmatrix} 1/32 & 1/32 & 1/8 & 1/32 & 1/32 \\ 1/16 & 1/16 & 1/4 & 1/16 & 1/16 \\ 1/32 & 1/32 & 1/8 & 1/32 & 1/32 \end{bmatrix}$$

The output of the adder 826 is multiplied by a certain constant set externally by a variable constant multiplier 843 and added to the output of the adder 842 at an adder 844. Three sets of constant multipliers 845 to 849, 850 to 854 and 855 to 859 are set at (1/16, 3/16, ¼, 3/16, 1/16), (⅛, 3/8, ½, 3/8, ⅛) and (1/16, 3/16, ¼, 3/16, 1/16), respectively. In each set of the constant multipliers, in the same manner as of the fifth embodiment, the outputs at every fourth tap are collectively added at an adder. For instance, the outputs of the constant multipliers 845 and 848 and the outputs of the constant multipliers 850, 853, 855 and 858 are collectively added at an adder 860. Thus, the following color low-pass filter can be realized:

$$\begin{bmatrix} 1/16 & 3/16 & 1/4 & 3/16 & 1/16 \\ 1/8 & 3/8 & 1/2 & 3/8 & 1/8 \\ 1/16 & 3/16 & 1/4 & 3/16 & 1/16 \end{bmatrix}$$

The operation of a switch 872 is the same as of the switch 436 shown in FIG. 19. In this case, both the one pixel delay and 1H memory are shared by three filters, thus reducing the circuit scale greatly. Further, it is obvious that the one pixel delay in FIG. 19 may be replaced with a 1H memory, a common filtering is first performed in the vertical direction, and then a filtering in the horizontal direction is performed independently for the luminance and color signals.

Figure 22:
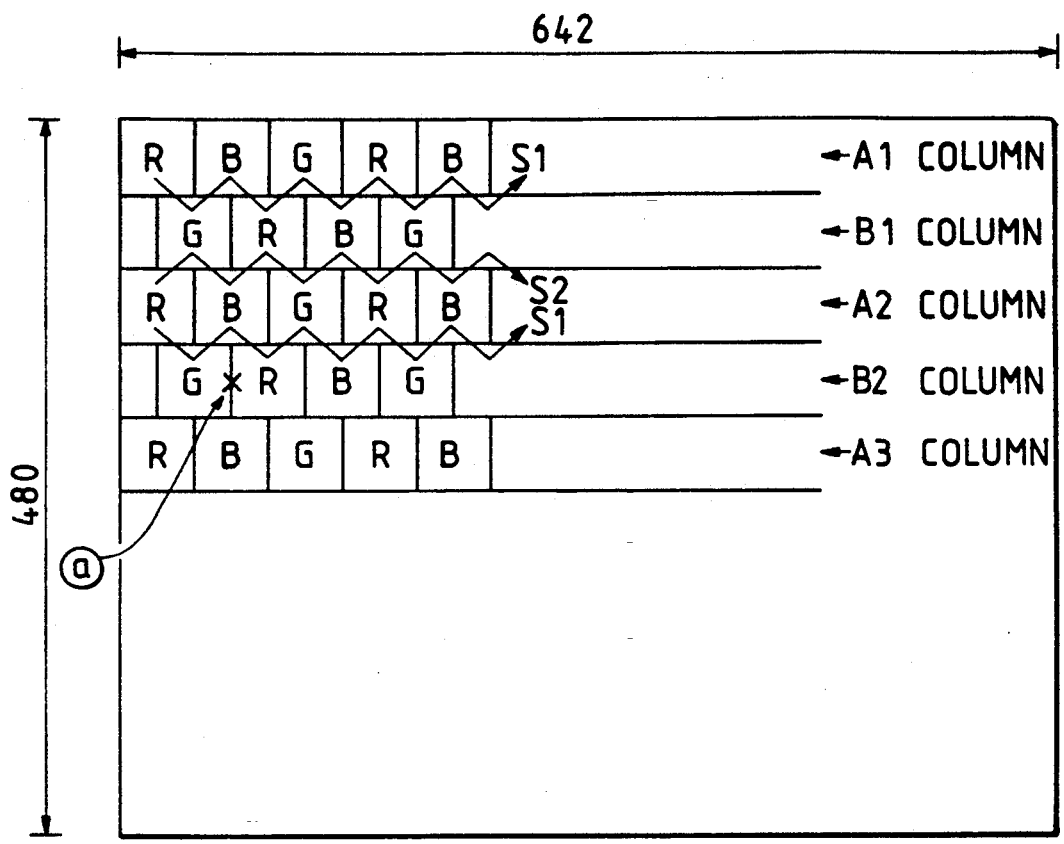
FIG. 22 is a diagram illustrating a color sensor of an offset sampling array.
Figure 23:
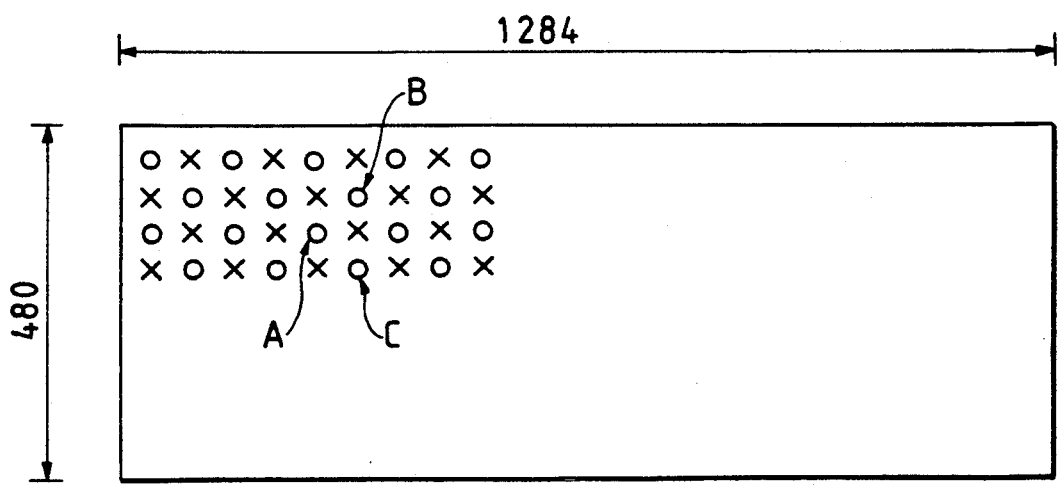
FIG. 23 is a view used for illustrating the offset sampling array.

Next, a seventh embodiment shown in FIG. 22 will be described wherein the present invention is applied to a sensor having an offset sampling array. 642 pixels in the horizontal direction and 480 pixels in the vertical direction are disposed shifted by half a pixel at every second line. The color filter array is as shown in FIG. 22. Since the same color filters are disposed in the vertical direction, information at an intermediate point between adjacent pixels is indicated at (a) in FIG. 22, and some pixels at upper and lower lines are used for interpolation. After interpolation, R, G and B signals corresponding to 1284 pixels in the order recited are disposed at a line. Therefore, the following processing is the same as in the first embodiment. Interpolation is a kind of a low-pass filtering. Assuming that the position indicated at a circle in FIG. 23 is the place where information is present, and the place indicated by a cross x is the place to be inserted with a zero signal. Then, a low-pass filtering is performed in the vertical direction. For instance, a luminance signal is subjected to a low-pass filtering such as:

$$Y_{L12} = \begin{bmatrix} 1/2 \\ 1 \\ 1/2 \end{bmatrix},$$

$$Y_{L2} = \begin{bmatrix} 1 \\ 1 \end{bmatrix}$$

If YL1 is used, A becomes (B+C), and B and C are as they are. A color signal is subjected to a low-pass filtering such as:

$$C_{L1} = \begin{bmatrix} 1/3 \\ 1/3 \\ 1/3 \end{bmatrix}$$

$$C_{L2} = \begin{bmatrix} 1/4 \\ 1/4 \\ 1/4 \\ 1/4 \end{bmatrix}$$

If an odd number tap is used as in the case of YL1 for a luminance signal, an odd number tap is used as in the case of CL1 for a color signal. Conversely, if an even number tap is used for a luminance signal, an even tap number is used for a color signal, in order to eliminate a phase difference between the luminance and color signals in the vertical direction. In addition, if an even number tap is used, the entire phase is shifted by 0.5 vertical line which poses no problem if the phase between the luminance and color signals is the same.

Figure 24:
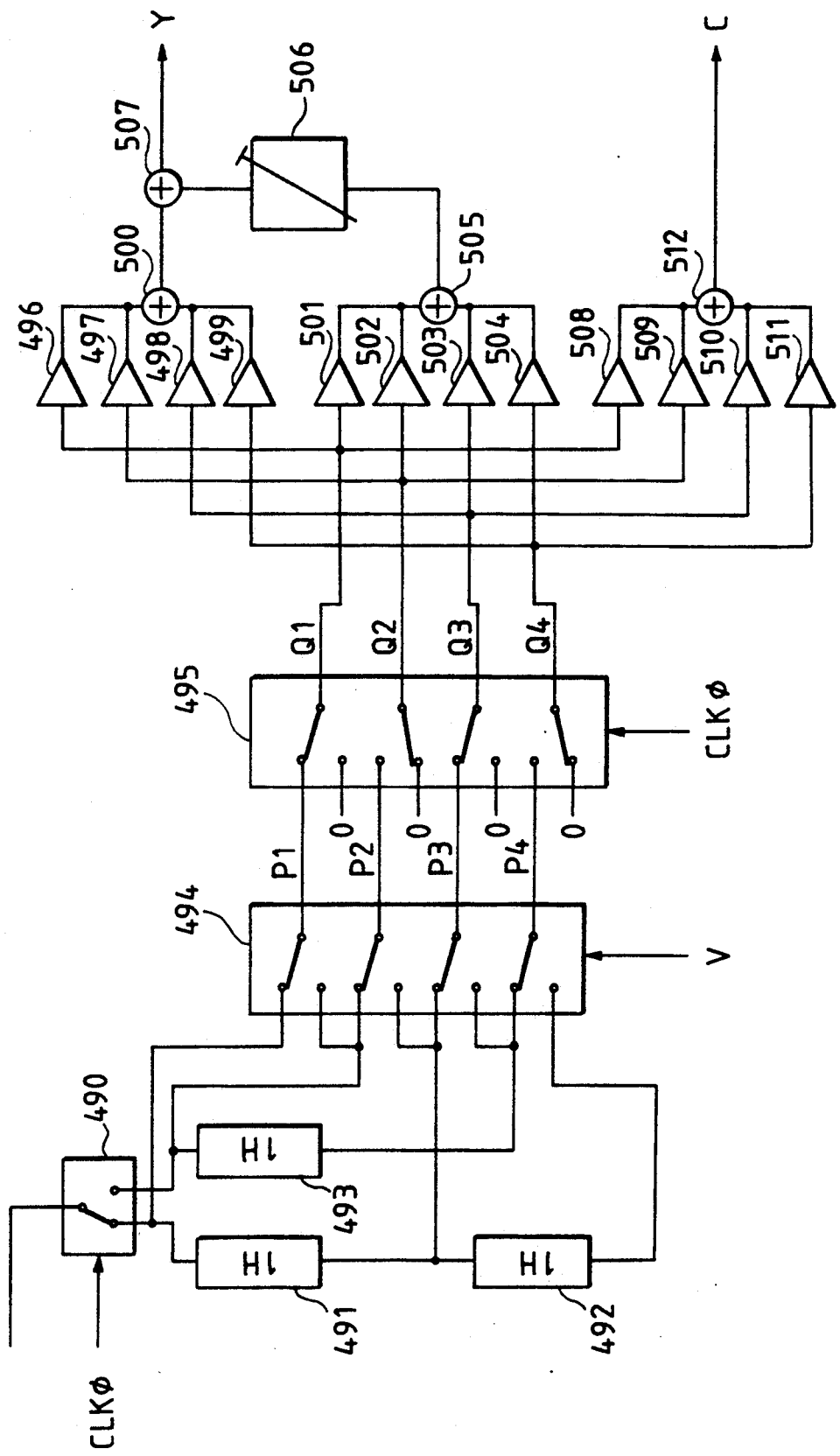
FIGS. 24 and 25 are block diagrams respectively showing seventh and eighth embodiments where the invention is applied to a sensor having an offset sampling array.

Also for the sensor of this type, a vertical aperture correction filter can share the 1H memory and taps of the vertical luminance and color low-pass filters, in the same manner as in the previously described embodiments. FIG. 24 is a block diagram of the circuit arrangement wherein the present invention is applied to the sensor shown in FIG. 22. Signals read from the sensor as indicated at S1 in FIG. 22 are A/D converted and supplied to a switch 490 which operates in synchro with clock CLK0 for reading the sensor. The switch 490 sends Ai line signals to a 642-stage shift register 493, and Bi line signals to a 642-stage shift register 491. The transfer clock for the shift registers is CLK1 whose period is half the CLK0. A switch 494 is of (2×4) structure which operates in synchro with each one field.

Assuming that the output of the shift register 492 is B1 line signals, the input and output of the shift register 491 are B3 and B1, and the input and output of the shift register 493 are A3 and A2. Therefore, assuming that the switch 494 is set on the upper side relative to the first field, outputted to the four terminals P1, P2, P3 and P4 of the switch 494 are B3, A3, B2 and A2 line data. Since the switch 494 is set on the lower side at the second field, outputted to the terminals P1, P2, P3 and P4 are A3, B2, A2 and B1 line data. A switch 495 alternately selects the data P1, P2, P3 and P4 and a zero signal in synchro with clock CLK0 to thus output Q1, Q2, Q3 and Q4 which are subjected to luminance low-pass filtering, aperture correction filtering, and color low-pass filtering, with the zero signals being inserted to the position indicated by a cross x in FIG. 23.

Constant multipliers 496, 497, 498 and 499 respectively set at, e.g., (0, 1, 1, 0) and an adder 500 constitute a vertical luminance low-pass filter. Such constant setting causes a zero response to the vertical resolution of 480 TV lines. If the signals are field-recorded in a still video floppy, the constants are preferably set at ($\frac{1}{4}$, $\frac{1}{4}$, $\frac{1}{4}$, $\frac{1}{4}$) to eliminate moire in the vertical direction. With such an arrangement, a response to the vertical resolution of 240 TV lines becomes zero so that moire is reduced to a large extent.

An external switch may be provided to switch between the above two sets of constants. Constant multipliers 501, 502, 503 and 504 respectively set at, e.g., (−1, 1, 1, −1) and an adder 505 constitute a luminance wideband band-pass filter the output of which is multiplied by a certain constant at a variable constant multiplier 506.

An adder 507 adds together the outputs of the adder 500 and of the variable constant multiplier 506 to deliver a vertically filtered luminance signal Y. Constant multipliers 508, 509, 510 and 511 respectively set at, e.g., ($\frac{1}{4}$, $\frac{1}{4}$, $\frac{1}{4}$, $\frac{1}{4}$) and an adder 512 constitute a vertical color low-pass filter. Such constant setting causes a zero response to the vertical resolution 240 TV lines. Therefore, if a color difference line sequential recording is performed relative to a still video floppy for example, generation of color moire in the vertical direction can be effectively suppressed.

For a moving image, there is no need to make the color bandwidth in the vertical direction zero for the 240 TV lines. Therefore, for instance, constant setting at (0, 1, 1, 0) may be used. In this case, the color vertical low-pass filter becomes the same as the luminance vertical low-pass filter so that the constant multipliers can be used in common without necessitating the constant multipliers 508, 510 and 511 and the adder 512.

An external switch may be provided, if desired, to switch between the above two sets of constants. This switch may be arranged to be turned on and off in cooperative relation with the above-described switch for the luminance low-pass filter.

After the above vertical filtering, the horizontal filtering is independently performed for the luminance and color signal processings.

Figure 25:
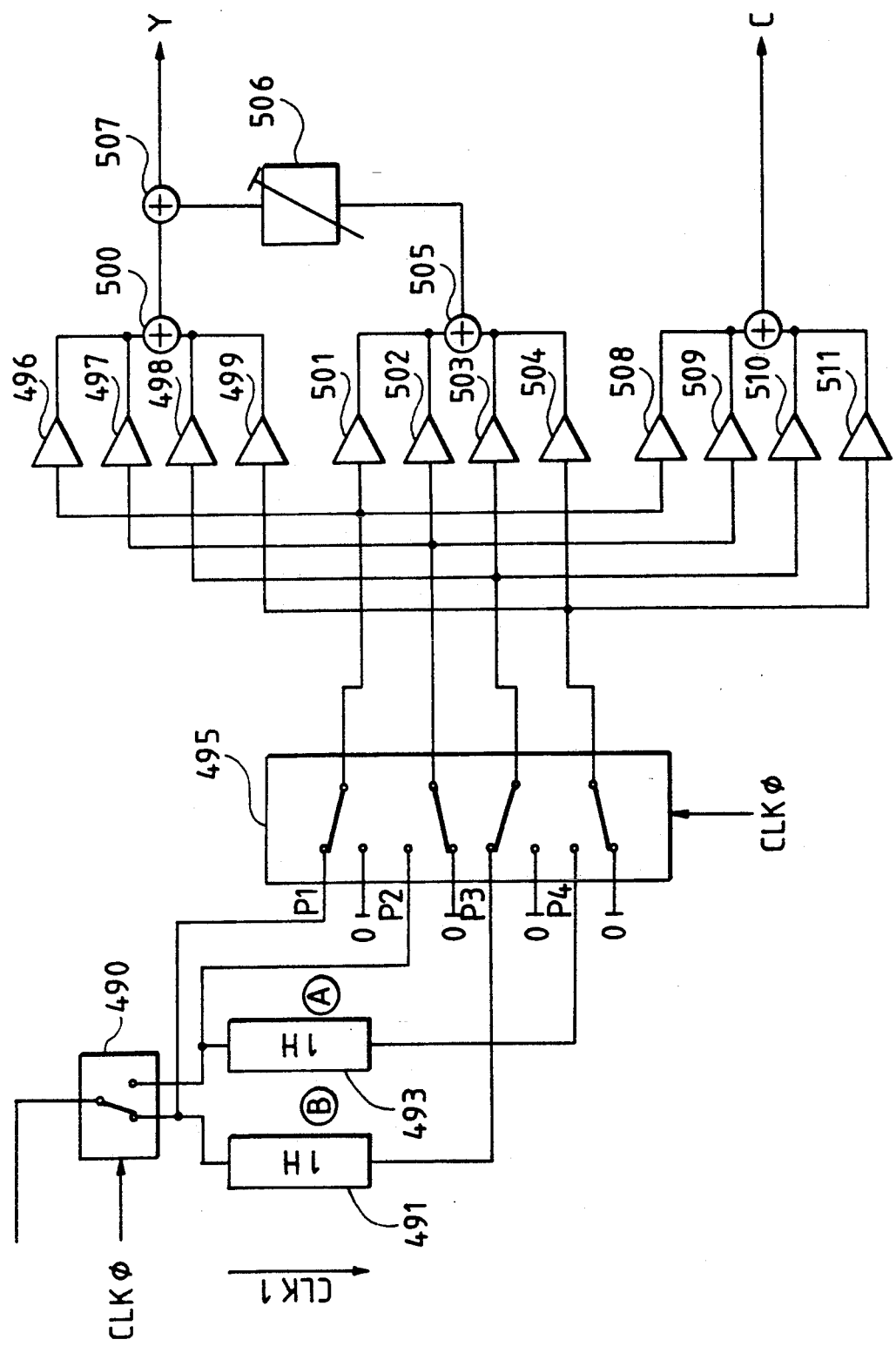

FIG. 25 shows an eighth embodiment wherein the present invention is applied to a sensor having an offset sampling array as shown in FIG. 22. In this embodiment, as different from FIG. 24, although signals from the sensor are read at the first field in the order indicated at S1, signals are read at the second field in the order indicated at S2. In the same manner as the seventh embodiment, at the first field a switch 490 sends Ai line signals to a shift register 493, and Bi line signals to a shift register 491. Therefore, while signals at S1 on the A2 and B2 lines are scanned, B2, A2, B1 and A1 line data are outputted to terminals P1, P2, P3 and P4. At the second field, a switch 490 sends Bi line signals to the shift register 493, and Ai+1 line signals to the shift register 491. Therefore, while signals at S2 on the B2 and A3 lines are scanned, A3, B2, A2 and B1 line data are outputted to the terminals P1, P2, P3 and P4. Consequently, by reading signals from the sensor in the order S1 at the first field, and in the order S2 at the second field, the same outputs as described with respect to FIG. 24 can be obtained by two shift registers at the terminals P1, P2, P3 and P4, thus reducing the circuit scale. The succeeding operation is the same as that of FIG. 24.

In the above embodiment, signals are read in the zigzag manner as indicated at S1 or S2 in real time. However, it is obvious that signals may be temporarily stored in a memory to read them thereafter.

According to the fifth to eighth embodiments of this invention, the delay circuits and taps of the luminance low-pass filter in the horizontal and/or vertical direction can be shared with those of the color low-pass filter or luminance aperture compensation filter, allowing a considerable reduction of the circuit scale. The present invention is also applicable to a single-plate sensor having a so-called offset sampling filter array of a stripe filter array.

We claim:

1. A color signal processing apparatus for processing signals from a color single-plate sensor and obtaining a luminance signal from a first digital processing and a plurality of color signals from a second digital processing, comprising:
   a common digital low-pass filter, for filtering both the luminance signal and the plurality of color signals, said common digital low-pass filter performing a digital processing which is common to both said first and second digital processings; and
   a plurality of non-common digital low-pass filters for filtering the luminance signal and the plurality of color signals respectively, said plurality of non-common digital low-pass filters respectively performing a digital processing which is not common to said first and second digital processings,
   wherein said common digital low-pass filter and said non-common digital low-pass filters constitute a first two-dimensional filter for the luminance signal and a second two-dimensional filter for the plurality of color signals.

2. A color signal processing apparatus according to claim 1, wherein said common digital low-pass filter comprises a shift register having a number of stages equal to the number of pixels of said single plate sensor in the horizontal direction, and a switch for alternately selecting a zero signal and data, the common digital low-pass filtering being performed digitally.

3. A color signal processing apparatus according to claim 1, wherein said color single-plate sensor includes a CCD sensor having an offset pixel structure.

4. A color signal processing apparatus according to claim 3, wherein signals from said single-plate sensor are obtained by scanning in a zigzag fashion over odd and even lines, and wherein the final signals to be outputted from said single plate sensor are interlaced.

5. A color signal processing apparatus according to claim 1, further comprising a color filter disposed adjacent said color single-plate sensor.

6. A color signal processing apparatus according to claim 5, wherein said color filter includes a complementary color filter.

7. A color signal processing apparatus according to claim 5, wherein said color filter includes a pure color filter.

8. A color signal processing apparatus according to claim 1, wherein each of the digital low-pass filters includes a plurality of delay means and addition means for adding outputs of said plurality of delay means with a predetermined weighing.

9. A color signal processing apparatus comprising:
   an FIR type digital low-pass filter for commonly filtering a luminance signal and three color signals provided from a color single-plate sensor having an offset sampling filter array or stripe filter array;
   a first adder for adding together signals at every $(3i+1)$-th tap of said digital low-pass filter;
   a second adder for adding together signals at every $(3i+2)$-th tap of said digital low-pass filter;
   a third adder for adding together signals at every $(3i)$-th tap of said digital low-pass filter; and
   means for sequentially switching the outputs of said first, second and third adders to output said three color signals.

10. A color signal processing apparatus according to claim 9, wherein said color single-plate sensor includes a CCD sensor.

11. A color signal processing apparatus according to claim 9, wherein said color single-plate sensor has an offset sampling filter array, wherein signals from the sensor are obtained by scanning in a zigzag fashion over odd and even lines, and wherein final signals to be outputted from the sensor are interlaced.

12. A color signal processing apparatus according to claim 9, wherein the color single-plate sensor includes a pure color filter.

13. A color signal processing apparatus according to claim 9, wherein the color single-plate sensor includes a complementary color filter.

* * * * *

UNITED STATES PATENT AND TRADEMARK OFFICE
CERTIFICATE OF CORRECTION

PATENT NO. : 5,319,451  Page 1 of 2
DATED : June 7, 1994
INVENTOR(S) : TAKASHI SASAKI, et al.

It is certified that error appears in the above-indentified patent and that said Letters Patent is hereby corrected as shown below:

COLUMN 2:
    Line 48, "effects" should read --effect--.

COLUMN 3:
    Line 26, "are" should read --is--.

COLUMN 4:
    Line 27, "1/28" should read --1/8--.

COLUMN 6:
    Line 65, "an" should read --a--.

COLUMN 8:
    Line 42, "two-bold" should read --two-fold--.

COLUMN 10:
    Line 56, "e.g.," should read --(e.g.,--.

COLUMN 12:
    Line 31, "uses" should read --used--.

COLUMN 13:
    Line 13, "0¼" should read --0, ¼--; and "¼and" should read --¼ and--.

COLUMN 14:
    Line 16, "$^7/_4$" should read --¼--; and
    Line 22, "$^7/_4$" should read --¼--.

UNITED STATES PATENT AND TRADEMARK OFFICE
CERTIFICATE OF CORRECTION

PATENT NO. : 5,319,451
DATED : June 7, 1994
INVENTOR(S) : TAKASHI SASAKI, et al.

It is certified that error appears in the above-indentified patent and that said Letters Patent is hereby corrected as shown below:

COLUMN 18:
    Line 1, "single plate" should read --single-plate--; and
    Line 12, "single plate" should read --single-plate--.

Signed and Sealed this

Twenty-second Day of November, 1994

Attest:

BRUCE LEHMAN

Attesting Officer     Commissioner of Patents and Trademarks